(12) United States Patent
Kim et al.

(10) Patent No.: US 8,712,393 B2
(45) Date of Patent: Apr. 29, 2014

(54) SELECTING INPUT/OUTPUT COMPONENTS OF A MOBILE TERMINAL

(75) Inventors: Ho-Soo Kim, Seoul (KR); Seong-Uk Min, Seoul (KR)

(73) Assignee: LG Electronics Inc., Seoul (KR)

( * ) Notice: Subject to any disclaimer, the term of this patent is extended or adjusted under 35 U.S.C. 154(b) by 342 days.

(21) Appl. No.: 12/717,368

(22) Filed: Mar. 4, 2010

(65) Prior Publication Data

US 2011/0045812 A1 Feb. 24, 2011

(30) Foreign Application Priority Data

Aug. 21, 2009 (KR) ........................ 10-2009-0077791

(51) Int. Cl.
*H04M 3/00* (2006.01)
*H04M 1/00* (2006.01)

(52) U.S. Cl.
USPC ...................................... 455/418; 455/556.1

(58) Field of Classification Search
USPC ........ 455/418–420, 425, 432.3, 550.1, 552.1, 455/553.1, 556.1, 556.2, 557, 566, 5, 69.1, 455/575.1–575.8, 90.3, 149, 346–350; 367/118–130; 379/433.02, 433.03, 379/432, 420; 381/300–311, 26, 85, 381/111–117, 122; 700/25, 28, 58, 62–64; 704/270–278
See application file for complete search history.

(56) References Cited

U.S. PATENT DOCUMENTS

| 6,522,894 | B1 * | 2/2003 | Schmidt ..................... 455/552.1 |
| 6,993,366 | B2 * | 1/2006 | Kim ........................... 455/569.1 |
| 8,077,964 | B2 * | 12/2011 | Berestov et al. ............. 382/154 |
| 2003/0203747 | A1 * | 10/2003 | Nagamine .................. 455/575.3 |
| 2007/0004451 | A1 * | 1/2007 | Anderson .................. 455/556.1 |
| 2008/0119237 | A1 * | 5/2008 | Kim ............................... 455/566 |
| 2008/0146289 | A1 * | 6/2008 | Korneluk et al. .......... 455/569.1 |
| 2010/0080084 | A1 * | 4/2010 | Chen et al. .................... 367/118 |

* cited by examiner

*Primary Examiner* — San Htun
(74) *Attorney, Agent, or Firm* — Fish & Richardson P.C.

(57) ABSTRACT

A device includes a first microphone at a first position on the device, a second microphone at a second position on the device, a first speaker at a third position on the device, and a second speaker at a fourth position on the device. The first, second, third, and fourth positions of the device are different positions. The device also includes a controller configured to determine a physical characteristic of the device. The controller is further configured to select, based on the determined physical characteristic, among the first microphone at the first position on the device and the second microphone at the second position on the device. The controller is additionally configured to select, based on the determined physical characteristic, among the first speaker at the third position on the device and the second speaker at the fourth position on the device.

22 Claims, 20 Drawing Sheets

| FIRST MICROPHONE | FIRST SPEAKER | SECOND MICROPHONE | SECOND SPEAKER | ROTATION DIRECTION (CLOCK WISE) |
|---|---|---|---|---|
| ON | ON | OFF | OFF | FIRST DIRCETION (0 DEGREE) |
| OFF | OFF | OFF | OFF | SECOND DIRCETION (90 DEGREES) |
| OFF | OFF | ON | ON | THIRD DIRCETION (180 DEGREES) |
| OFF | OFF | OFF | OFF | FOURTH DIRCETION (270 DEGREES) |

[CALL MODE]

| FIRST MICROPHONE | FIRST SPEAKER | SECOND MICROPHONE | SECOND SPEAKER | ROTATION DIRECTION (CLOCK WISE) |
|---|---|---|---|---|
| ON | ON | OFF | ON | FIRST DIRCETION (0 DEGREE) |
| OFF | OFF | OFF | OFF | SECOND DIRCETION (90 DEGREES) |
| OFF | ON | ON | ON | THIRD DIRCETION (180 DEGREES) |
| OFF | OFF | OFF | OFF | FOURTH DIRCETION (270 DEGREES) |

[VIDEO CALL MODE]

| FIRST MICROPHONE | FIRST SPEAKER | SECOND MICROPHONE | SECOND SPEAKER | ROTATION DIRECTION (CLOCK WISE) |
|---|---|---|---|---|
| OFF | ON | OFF | ON | FIRST DIRCETION (0 DEGREE) |
| OFF | ON | OFF | ON | SECOND DIRCETION (90 DEGREES) |
| OFF | ON | OFF | ON | THIRD DIRCETION (180 DEGREES) |
| OFF | ON | OFF | ON | FOURTH DIRCETION (270 DEGREES) |

[MULTIMEDIA REPRODUCTION MODE]

| FIRST CAMERA | SECOND CAMERA | ROTATION DIRECTION (CLOCK WISE) |
|---|---|---|
| ON | OFF | FIRST DIRCETION (0 DEGREE) |
| ON | ON | SECOND DIRCETION (90 DEGREES) |
| ON | ON | THIRD DIRCETION (270 DEGREES) |

[CAMERA MODE]

GRAVITY DIRECTION

GRAVITY DIRECTION

SELECTING INPUT/OUTPUT COMPONENTS OF A MOBILE TERMINAL

CROSS-REFERENCE TO RELATED APPLICATION

Pursuant to 35 U.S.C. §119(a), this application claims the benefit of the earlier filing date and right of priority to Korean Application No. 10-2009-0077791, filed on Aug. 21, 2009, the contents of which is incorporated by reference herein in its entirety

BACKGROUND

Mobile devices can be used to provide wireless communication between users. As mobile device capability has advanced in recent years, mobile devices have increasingly become able to provide functionality in addition to wireless communication. For example, some mobile devices provide global positioning system (GPS) functionality. In addition, various mobile devices provide a display and touch screen functionality.

SUMMARY

In general, in some aspects, a device includes a first microphone at a first position on the device, a second microphone at a second position on the device, a first speaker at a third position on the device, and a second speaker at a fourth position on the device. The first, second, third, and fourth positions of the device are different positions. The device also includes a controller configured to determine a physical characteristic of the device. The controller is further configured to select, based on the determined physical characteristic, among the first microphone at the first position on the device and the second microphone at the second position on the device. The controller is additionally configured to select, based on the determined physical characteristic, among the first speaker at the third position on the device or the second speaker at the fourth position on the device.

This and other implementations can optionally include one or more of the following features, which also may optionally be in any combination. For example, the controller can be configured to select, if the determined physical characteristic is a first physical characteristic, the first microphone at the first position on the device and the first speaker at the third position on the device, to activate, based on the selected first microphone at the first position on the device and the first speaker at the third position on the device, the first microphone at the first position on the device and the first speaker at the third position on the device, and to deactivate, based on the selected first microphone at the first position on the device and the first speaker at the third position on the device, the second microphone at the second position on the device and the second speaker at the fourth position on the device. Also, the controller can be configured to select, if the determined physical characteristic is a second physical characteristic, the second microphone at the second position on the device and the second speaker at the fourth position on the device, to activate, based on the selected second microphone at the second position on the device and the second speaker at the fourth position on the device, the second microphone at the second position on the device and the second speaker at the fourth position on the device, and to deactivate, based on the selected second microphone at the second position on the device and the second speaker at the fourth position on the device, the first microphone at the first position on the device and the first speaker at the third position on the device.

Moreover, activation of the first microphone at the first location of the device and the first speaker at the third location of the device and deactivation of the second microphone at the second location of the device and the second speaker at the fourth location of the device can constitute a first operation mode of the controller. Activation of the second microphone at the second location of the device and the second speaker at the fourth location of the device and deactivation of the first microphone at the first location of the device and the first speaker at the third location of the device can constitute a second operation mode of the controller. The controller can be configured to select, based on the determined physical characteristic, among the first and second operation modes.

The device can also include a sensing unit. To determine the physical characteristic of the device, the controller can be configured to receive and process data from the sensing unit related to a sensed posture of the device and the controller can be configured to select among the microphone and the speaker based on the processed data related to the sensed posture. The sensing unit can include one or more accelerometers. To determine the physical characteristic of the device, the controller can be configured to receive and process data from the one or more accelerometers related to a sensed posture of the device and the controller can be configured to select among the microphone and the speaker based on the processed data related to the sensed posture. The one or more accelerometers can be configured to sense one or more rotational direction angles of the device. To determine the physical characteristic of the device, the controller can be configured to receive and process data from the sensing unit related to the one or more rotational direction angles of the device and the controller can be configured to select among the microphone and the speaker based on the processed data related to the one or more rotational direction angles of the device.

Further, the device can includes a display. The controller can be configured to select, based on the determined physical characteristic, among a first orientation of a graphical user interface to be rendered on the display and a second orientation of the graphical user interface to be rendered on the display. The controller can include one or more processors. The device can be a mobile telephone. Additionally, the device can include a first camera and a second camera. The controller can be configured to select, based on the determined physical characteristic, the first and second cameras for use in generating a three-dimensional image.

In other implementations, some aspects include a method. The method includes determining a physical characteristic of a device. The device includes a first microphone at a first position on the device, a second microphone at a second position on the device, a first speaker at a third position on the device, and a second speaker at a fourth position on the device. The first, second, third, and fourth positions of the device are different positions. The method also includes selecting, based on the determined physical characteristic, among the first microphone at the first position on the device and the second microphone at a second position on the device. The method further includes selecting, based on the determined physical characteristic, among the first speaker at the third position on the device and the second speaker at a fourth position on the device.

This and other implementations can optionally include one or more of the following features, which also may optionally be in any combination. For example, the method can also include selecting, if the determined physical characteristic is a first physical characteristic, the first microphone at the first position on the device and the first speaker at the third position on the device, activating, based on the selected first microphone at the first position on the device and the first speaker at the third position on the device, the first microphone at the first position on the device and the first speaker at the third position on the device, and deactivating, based on the selected first microphone at the first position on the device and the first speaker at the third position on the device, the second microphone at the second position on the device and the second speaker at the fourth position on the device. The method can further include selecting, if the determined physical characteristic is a second physical characteristic, the second microphone at the second position on the device and the second speaker at the fourth position on the device, activating, based on the selected second microphone at the second position on the device and the second speaker at the fourth position on the device, the second microphone at the second position on the device and the second speaker at the fourth position on the device, and deactivating, based on the selected second microphone at the second position on the device and the second speaker at the fourth position on the device, the first microphone at the first position on the device and the first speaker at the third position on the device.

Additionally, activation of the first microphone at the first location of the device and the first speaker at the third location of the device and deactivation of the second microphone at the second location of the device and the second speaker at the fourth location of the device can constitute a first operation mode of the controller. Activation of the second microphone at the second location of the device and the second speaker at the fourth location of the device and deactivation of the first microphone at the first location of the device and the first speaker at the third location of the device can constitute a second operation mode of the controller. The method can include selecting, based on the determined physical characteristic, among the first and second operation modes. The method can further include sensing the characteristic of the device with a sensing unit. Determining the physical characteristic of the device can include receiving and processing data from the sensing unit related to a sensed posture of the device.

Further, the sensing unit can include one or more accelerometers and determining the physical characteristic of the device can include receiving and processing data from the one or more accelerometers related to a sensed posture of the device. The one or more accelerometers can be configured to sense one or more rotational direction angles of the device and determining the physical characteristic of to the device can include receiving and processing data from the one or more accelerometers related to the one or more rotational direction angles of the device. Moreover, the method can include selecting, based on the determined physical characteristic, among a first orientation of a graphical user interface to be rendered on a display and a second orientation of the graphical user interface to be rendered on the display. The device can be a mobile telephone. Finally, the method can include selecting, based on the determined physical characteristic, a first camera and a second camera for use in generating a three-dimensional image.

DETAILED DESCRIPTION

Figure 1:
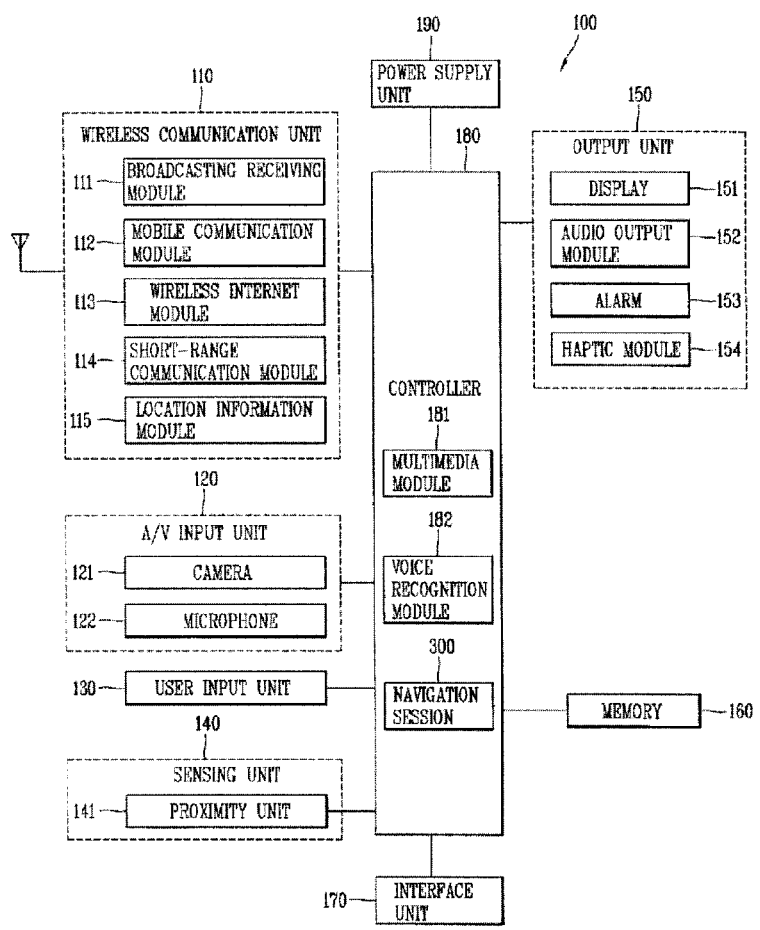
FIG. 1 is a schematic block diagram showing a configuration of a mobile communication terminal.

FIG. 1 is a schematic block diagram showing a configuration of a mobile communication terminal. The mobile communication terminal 100 may be implemented in various forms, such as mobile phones, smart phones, notebook computers, digital broadcast terminals, Personal Digital Assistants (PDAs), or Portable Multimedia Player (PMPs).

As shown in FIG. 1, the mobile communication terminal 100 includes a wireless communication unit 110, an Audio/Video (A/V) input unit 120, a user input unit 130, a sensing unit 140, an output unit 150, a memory 160, an interface unit 170, a controller 180, and a power supply unit 190. FIG. 1 shows the mobile communication terminal 100 having various components, but it is understood that implementing all of the illustrated components is not a requirement. In particular, various implementations of the mobile communication terminal 100 may include greater or fewer components in configurations other than the configuration illustrated by FIG. 1.

The wireless communication unit 110 can include one or more components that enable radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server or other network entity (not shown) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, or other signals. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, broadcast associated information may be implemented according to various formats, such as electronic program guide (EPG) of digital multimedia broadcasting (DMB) or electronic service guide (ESG) of digital video broadcast-handheld (DVB-H).

The broadcast receiving module 111 may be configured to receive signals broadcast using various types of broadcast systems. In particular, the broadcast receiving module 111 may receive a digital broadcast using a digital broadcast system, such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), or other systems. The broadcast receiving module 111 may be configured to be suitable for broadcast systems that provide a broadcast signal as well as the above-mentioned digital broadcast systems. Broadcast signals and/or broadcast-associated information received via the broadcast receiving module 111 may be stored in the memory 160.

The mobile communication module 112 may transmit and receive radio signals to and from at least one of a base station (e.g., access point, Node B, etc.), an external terminal (e.g., other user devices) and a server (or other network entities). Such radio signals may include a voice call signal, a video call signal, or various types of data according to text and/or multimedia message transmission and reception.

The wireless Internet module 113 supports wireless Internet access for the mobile communication terminal. This module may be internally or externally coupled to the terminal. The form of wireless communication utilized by the wireless Internet module 113 can be, for example, wireless local area network (WLAN), Wi-Fi, wireless broadband (WiBro), world interoperability for microwave access (WiMAX), or high speed downlink packet access (HSDPA). The short-range communication module 114 is a module for supporting short range communications. Some examples of short-range communication technology include Bluetooth™, Radio Frequency IDentification (RFID), Infrared Data Association (IrDA), Ultra-WideBand (UWB), and ZigBee™.

The location information module 115 is a module for checking or acquiring a location (or position) of the mobile communication terminal or vehicle in which the mobile communication terminal is located. For example, the location information module 115 may be embodied by using a Global Positioning System (GPS) module that receives location information from a plurality of satellites. Here, the location information may include coordinate information represented by latitude and longitude values. For example, the GPS module may measure time and distance with respect to three or more satellites so as to calculate a current location of the mobile communication terminal 100 according to trigonometry based on the measured time and distances. A method of acquiring distance and time information from three satellites and performing error correction with a single satellite may be used. In particular, the GPS module may acquire time and three-dimensional speed information as well as a latitude, longitude, and altitude from the location information received from the satellites. A Wi-Fi position system and/or hybrid positioning system may be used as the location information module 115.

The A/V input unit 120 is configured to receive an audio or video signal. The A/V input unit 120 may include a camera 121 and a microphone. The camera 121 processes image data of still pictures or video obtained by an image capture device in a video capturing mode or an image capturing mode. The processed image frames may be displayed on the display unit 151 (or other visual output device). The image frames processed by the camera 121 may be stored in the memory 160 or transmitted via the wireless communication unit 110. Two or more cameras 121 may be provided according to the configuration of the mobile communication terminal.

The microphone 122 may receive sounds via a microphone in a phone call mode, a recording mode, a voice recognition mode, or other modes. Also, the microphone and related hardware can process sounds into audio data. In implementations using mobile telephone systems, the processed audio data may be converted for output into a format transmittable to a mobile communication base station (or other network entity) via the mobile communication module 112. The microphone 122 may implement various types of noise canceling (or suppression) algorithms to cancel or otherwise suppress noise or interference generated in the course of receiving and transmitting audio signals.

The user input unit 130 may generate key input data from commands entered by a user to control various operations of the mobile communication terminal 100. The user input unit 130 allows the user to enter various types of information, and may include a keypad, a dome switch, a touch pad (e.g., a touch sensitive member that detects changes in resistance, pressure, or capacitance, due to being adjacent to or in contact with an object) a jog wheel, a jog switch, or other input mechanisms. In particular, when the touch pad is overlaid on the display unit 151 in a layered manner, it may form a touch screen.

The sensing unit 140 detects a current status (or state) of the mobile communication terminal 100, such as an opened or closed state of the mobile communication terminal 100, a location of the mobile communication terminal 100, the presence or absence of user contact with the mobile communication terminal 100 (i.e., touch inputs), the orientation of the mobile communication terminal 100, an acceleration or deceleration movement and direction of the mobile communication terminal 100, or other inputs, so as to generate commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 serves as an interface by which at least one external device may be connected with the mobile communication terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, or earphone ports. Here, the identification module may be a memory chip (or other element with memory or storage capabilities) that stores various information for authenticating user authority for using the mobile communication terminal 100. This information may include a user identity module (UIM), a subscriber identity module (SIM), a universal subscriber identity module (USIM), or other information.

In addition, the device having the identification module (referred to as the 'identifying device', hereinafter) may take the form of a smart card. Accordingly, the identifying device may be connected with the mobile communication terminal 100 via a port or other connection means. The interface unit 170 may be used to receive inputs (e.g., data, information, or power) from an external device and transfer the received inputs to one or more elements within the mobile communication terminal 100 or may be used to transfer data between the mobile communication terminal and an external device.

The output unit 150 is configured to provide outputs in a visual, audible, and/or tactile manner (e.g., audio signal, video signal, alarm signal, or vibration signal). The output unit 150 may include the display unit 151, an audio output module 152, an alarm unit 153 or other units.

The display unit 151 may display information processed in the mobile communication terminal 100. For example, when the mobile communication terminal 100 is in a phone call mode, the display unit 151 may display a User Interface (UI) or a Graphic User Interface (GUI) associated with a call or other communication (e.g., text messaging or multimedia file downloading). When the mobile communication terminal 100 is in a video call mode or image capturing mode, the display unit 151 may display a captured image and/or a received image, or a UI or GUI that shows videos or images and functions related thereto.

The display unit 151 may include at least one of a Liquid Crystal Display (LCD), a Thin Film Transistor-LCD (TFT-LCD), an Organic Light Emitting Diode (OLED) display, a flexible display, or a three-dimensional (3D) display. The mobile communication terminal 100 may include two or more display units (or other display means) according to desired functionality. For example, the mobile terminal may include both an external display unit (not shown) and an internal display unit (not shown).

When the display unit 151 and the touch pad are overlaid in a layered manner to form a touch screen, the display unit 151 may function as both an input device and an output device. The touch sensor may, for example, have the form of a touch film, a touch sheet, or a touch pad. In some cases, touch sensors (or touch screens) can operate without an actual physical contact. For example, touch screens operating on changed capacitance or other electrical characteristics may operate by the nearby presence of a finger or object with or without physical contact with the screen. As such, a "touch screen" may not actually require a touch for operation The touch sensor may be configured to convert the pressure applied to a particular portion of the display unit 151 or a change in capacitance or other electrical characteristic generated at a particular portion of the display unit 151 into an electrical input signal. The touch sensor may be configured to detect a touch input pressure as well as a touch input position and a touch input area. When there is a touch input with respect to the touch sensor, the corresponding signal is sent to a touch controller (not shown). The touch controller processes the signal and transmits corresponding data to the controller 180. Accordingly, the controller 180 can recognize a touched region of the display unit 151.

Figure 2:
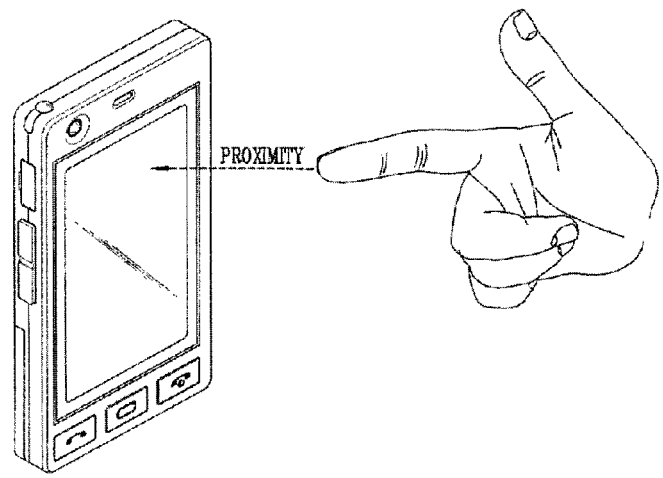
FIG. 2 illustrates a proximity touch.

A proximity sensor 141 of the mobile communication terminal 100 will now be described with reference to FIG. 2. FIG. 2 illustrates a proximity touch. Proximity touch can refer to recognition of a pointer or other object (e.g., a finger) positioned to be close to the touch screen without being actually in contact with the touch screen. In addition, a proximity touch can also refer to other touch screen functionality, as discussed above.

The proximity sensor 141 may be disposed within the mobile terminal covered by the touch screen or near the touch screen. The proximity sensor 141 can refer to a sensor for detecting the presence or absence of an object that accesses a certain detection surface or an object that exists nearby using the force of electromagnetism or infrared rays without a mechanical contact. Thus, the proximity sensor 141 can have a longer life span than a contact type sensor and can be utilized for various purposes.

Example of proximity sensors 141 include a transmission type photoelectric sensor, a direct reflection type photoelectric sensor, a mirror-reflection type photo sensor, an RF oscillation type proximity sensor, a capacitance type proximity sensor, a magnetic proximity sensor, and an infrared proximity sensor. When the touch screen is an electrostatic type touch screen, an approach of the pointer can be detected based on a change in an electric field according to the approach of the pointer. For example, the touch sensor may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch.' In this case, the pointer being in the state of the proximity touch can indicate that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, or a proximity touch movement state) and information corresponding to the detected proximity touch operation and the proximity touch pattern can be outputted to the touch screen.

The audio output module 152 may output audio data received from the wireless communication unit 110 or stored in the memory 160 in various modes. The modes may include a call signal reception mode, a call mode, a record mode, a voice recognition mode, a broadcast reception mode, or other modes. Also, the audio output module 152 may provide audible outputs related to a particular function (e.g., a call signal reception sound or a message reception sound) performed in the mobile communication terminal 100. The audio output module 152 may include, for example, a receiver, speaker, or buzzer.

The alarm unit 153 outputs a signal for informing a user about an occurrence of an event of the mobile communication terminal 100. Events generated in the mobile terminal may include receipt of a call, receipt of a message, or received key or touch input. In addition to video or audio signals, the alarm unit 153 may output signals in a different manner, for example, to inform a user about an occurrence of an event. The video or audio signals may be also outputted via the audio output module 152, so the display unit 151 and the audio output module 152 may be classified as parts of the alarm unit 153.

A haptic module 154 generates various tactile effects the user may feel, such as, for example, vibration. The strength and pattern of the haptic module 154 can be controlled. For example, different vibrations may be combined to be outputted or sequentially outputted. Besides vibration, the haptic module 154 may generate various other tactile effects. The generated effects can include stimulation with a pin arrangement moving vertically with respect to a contact skin, a spray force or suction force of air through a jet orifice or a suction opening, a contact on the skin, a contact of an electrode, electrostatic force, and the sense of cold or warmth using an element that can absorb or generate heat. In addition, the haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile communication terminal 100.

The memory 160 may store software programs used for the processing and controlling operations performed by the controller 180, or may temporarily store data (e.g., a phonebook, messages, still images, or video) that are inputted or outputted. In addition, the memory 160 may store data regarding various patterns of vibrations and audio signals outputted when a touch is inputted to the touch screen.

The memory 160 can be implemented using any type of suitable storage medium, such as, for example, flash memory, a hard disk, a multimedia card micro type, a card-type memory (e.g., SD or DX memory), Random Access Memory (RAM), Static Random Access Memory (SRAM), Read-Only Memory (ROM), Electrically Erasable Programmable Read-Only Memory (EEPROM), Programmable Read-Only memory (PROM), magnetic memory, a magnetic disk, and an optical disk. Also, the mobile communication terminal 100 may be operated in relation to a web storage device that performs the storage function of the memory 160 over the Internet.

The interface unit 170 serves as an interface with external devices connected with the mobile communication terminal 100. For example, the external devices may transmit data to or receive data from an external device or receive and transmit power to elements of the mobile communication terminal 100. For example, the interface unit 170 may include wired or wireless headset ports, external power supply ports, wired or wireless data ports, memory card ports, ports for connecting a device having an identification module, audio input/output (I/O) ports, video I/O ports, or earphone ports.

The identification module may be a chip that stores various information for authenticating the authority of using the mobile communication terminal 100 and may include a UIM, a SIM, a USIM), or other information. In addition, the identifying device may take the form of a smart card. Accordingly, the identifying device may be connected with the mobile communication terminal 100 via a port. The interface unit 170 may be used to receive inputs (e.g., data, information, or power) from an external device and transfer the received inputs to one or more elements within the mobile communication terminal 100 or may be used to transfer data between the mobile terminal and an external device.

When the mobile communication terminal 100 is connected with an external cradle, the interface unit 170 may serve as a passage to allow power from the cradle to be supplied therethrough to the mobile communication terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 can control the general operations of the mobile terminal. For example, the controller 180 can perform controlling and processing associated with voice calls, data communications, video calls, or other operations. The controller 180 may include a multimedia module 181 for reproducing multimedia data. The multimedia module 181 may be configured within the controller 180 or may be configured to be separated from the controller 180. Also, the controller 180 may perform pattern recognition processing to recognize a handwriting input or a picture drawing input on the touch screen as characters or images, respectively. The power supply unit 190 receives external power or internal power and supplies appropriate power required for operating respective elements and components under the control of the controller 180.

Various embodiments described herein may be implemented in a computer-readable medium using, for example, software, hardware, or a combination thereof.

For hardware implementations, the techniques described below may be implemented, for example, using application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and other electronic units designed to perform the functions described herein. In some implementations, functionality may be implemented by the controller 180 itself.

For software implementations, the techniques described below may be implemented by separate software modules. Each software module may perform one or more functions or operations described herein. Software codes can be implemented by a software application written in any suitable programming language. The software code may be stored in the memory 160 and executed by the controller 180. As such, the software code can be tangible embodied on a computer-readable medium. The voice recognition module 182 recognizes a voice pronounced by the user and performs a corresponding function according to the recognized voice signal.

A navigation session 300 applied to the mobile communication terminal 100 can be used in displaying a travel route from a current location to a destination. An apparatus and method for controlling a mobile terminal will now be described with reference to FIG. 3. The apparatus and method for controlling a mobile terminal may be applied to various mobile terminals such as smart phones, PDAs, PMPs, and to the mobile communication terminal 100.

Figure 3:
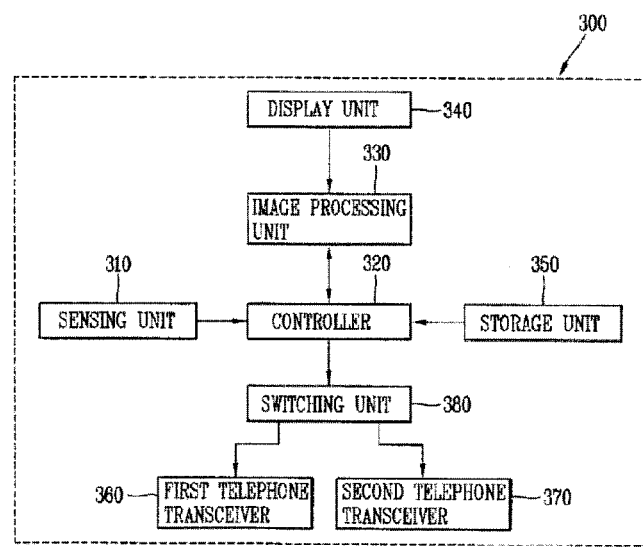
FIG. 3 is a schematic block diagram showing a configuration of an apparatus for controlling a mobile terminal.

FIG. 3 is a schematic block diagram showing a configuration of an apparatus for controlling a mobile terminal. As shown in FIG. 3, the apparatus for controlling a mobile terminal includes a first telephone transceiver 360 placed at a first position of the mobile terminal, a second telephone transceiver 370 placed at a second position of the mobile terminal, a sensing unit 310 configured to sense a posture of the mobile terminal, and a controller 320 configured to select the first telephone transceiver 360 or the second telephone transceiver 370 based on the posture of the mobile terminal The posture of the mobile terminal can refer to a characteristic of the physical orientation, such as the direction a portion of the mobile terminal (e.g., the screen) is facing or the angle a portion of the mobile terminal makes with respect to another object (e.g., the ground). The controller 320 may directly select the first telephone transceiver 360 or the second telephone transceiver 370, or select the first telephone transceiver 360 or the second telephone transceiver 370 via a switching unit 380.

The sensing unit 310 senses the posture of the mobile terminal by detecting a rotation direction angle of the mobile terminal. For example, the sensing unit 310 can sense the posture of the mobile terminal by sensing a rotation direction angle of the mobile terminal through a three-axis accelerometer that measures the three-axis acceleration of X, Y, and Z axes. The three-axis accelerometer can be installed at a lower end of the right portion of the mobile terminal, and can sense first to fourth directions of the mobile terminal based on the direction information of X, Y, and Z axes. The first direction may be 0 degrees, the second direction may be 90 degrees, the third direction may be 180 degrees, and the fourth direction may be 270 degrees.

In the following description, a mobile terminal is described as altering and/or outputting GUI data based on the posture of the mobile terminal. The manner of the alteration and the outputting and the rotation direction angles used, however, are exemplary. Other alterations and rotation direction angles may be used in various implementations.

When the mobile terminal is in a forward direction (i.e., when the mobile terminal is not rotated so it is in the first direction of 0 degree) based on the rotation direction angle of the mobile terminal, the controller 320 selects the first telephone transceiver 360, and when the mobile terminal is in a reverse direction (i.e., when the mobile terminal is rotated by 180 degrees) based on the rotation direction angle of the mobile terminal, the controller 320 selects the second telephone transceiver 370. Here, the storage unit 350 stores a look-up table for controlling the first telephone transceiver 360 and the second telephone transceiver 370 according to the rotation direction angle of the mobile terminal. The first telephone transceiver 360 and the second telephone transceiver 370 are configured as a microphone and a speaker.

The controller 320 outputs GUI data in the forward direction based on the rotation direction angle of the mobile terminal. For example, when the rotation direction angle of the mobile terminal sensed by the sensing unit 310 is 0 degrees, the controller 320 outputs GUI data to the display unit 340 through the image processing unit 330. In this case, when the rotation direction angle of the mobile terminal is 0 degrees, the image processing unit 330 outputs the GUI data to the display unit 340 without changing its format (e.g., it outputs the GUI data without first rotating the GUI data). Here, the GUI data can include video, a still image, characters, symbols, numbers, or other information.

When the rotation direction angle of the mobile terminal sensed by the sensing unit 310 is 90 degrees, the controller 320 reversely rotates the GUI data by 90 degrees counterclockwise through the image processing unit 330 and outputs the same to the display unit 340. Namely, when the rotation direction angle of the mobile terminal is 90 degrees (clockwise), the controller 320 reversely rotates the GUI data by 90 degrees counterclockwise to display the GUI data in the forward direction on the display unit 340. Accordingly, although the mobile terminal is tilted by 90 degrees, the user can view the GUI data in the forward direction.

When the rotation direction angle of the mobile terminal sensed by the sensing unit 310 is 180 degrees, the controller 320 rotates the GUI data by 180 degrees counterclockwise or clockwise through the image processing unit 330 and outputs the same to the display unit 340. Namely, when the rotation direction angle of the mobile terminal is 180 degrees (clockwise), the controller 320 rotates the GUI data by 180 degrees counterclockwise to display the GUI data in the forward direction on the display unit 340. Accordingly, although the mobile terminal is tilted by 180 degrees, the user can view the GUI data in the forward direction.

When the rotation direction angle of the mobile terminal sensed by the sensing unit 310 is 270 degrees, the controller 320 rotates the GUI data by 270 degrees counterclockwise or by 90 degrees clockwise through the image processing unit 330 and outputs the same to the display unit 340. Namely, when the rotation direction angle of the mobile terminal is 270 degrees (clockwise), the controller 320 rotates the GUI data by 270 degrees counterclockwise or by 90 degrees clockwise to display the GUI data in the forward direction on the display unit 340. Accordingly, although the mobile terminal is tilted by 270 degrees, the user can view the GUI data in the forward direction.

Figure 4:
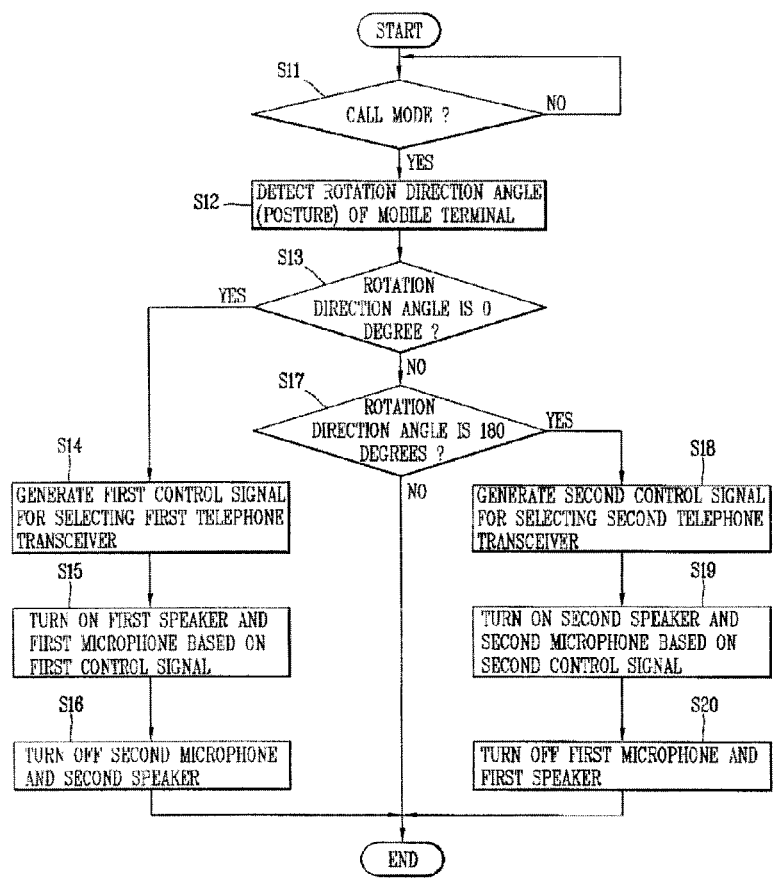
FIG. 4 is a flow chart of a first process for controlling a mobile terminal.

The following description references processes for controlling mobile terminals and other apparatuses according to various implementations. Although the processes described below reference elements discussed above, this referencing is exemplary. Other elements may be used in conjunction with carrying out the processes described below or portions thereof FIG. 4 is a flow chart of a first for controlling a mobile terminal. First, whether a mode is in a call mode is determined (S11). In particular, the controller 320 determines whether the mobile terminal is in a phone call mode. For example, the controller 320 determines whether a call key has been selected by the user or whether a call signal has been received. Here, the mobile terminal may be a full touch mobile communication terminal in which a call key and a key pad (e.g., keys corresponding to numbers, characters and symbols) can be selected from a touch screen.

Next, a rotation direction angle of a mobile terminal is detected (S12). In particular, when the mobile terminal is in the phone call mode, the sensing unit 310 senses the posture of the mobile terminal by detecting a rotation direction angle of the mobile terminal under the control of the controller 320. For example, the sensing unit 310 can sense the posture of the mobile terminal by sensing a rotation direction angle of the mobile terminal through a three-axis accelerometer that measures the three-axis acceleration of X, Y, and Z axes. The three-axis accelerometer is installed at a lower end of the right portion of the mobile terminal, and senses first to fourth directions of the mobile terminal based on the direction information of X, Y, and Z axes. The first direction may be 0 degrees, the second direction may be 90 degrees, the third direction may be 180 degrees, and the fourth direction may be 270 degrees. Further information regarding the sensing of the posture of an input device is disclosed in Korean Laid Open Publication No. 10-2006-0081509 and Korean Laid Open Publication No. 10-2006-0031092, both of which are incorporated herein in their entirety Then, whether a rotation direction angle is approximately 0 degrees is determined (S13). In particular, the controller 320 determines whether the rotation direction angle of the mobile terminal is approximately 0 degrees based on the rotation direction angle of the mobile terminal sensed by the sensing unit 310. The mobile device can be configured such that a rotation direction angle of approximately 0 degrees indicates that the mobile terminal has not been rotated. For brevity, the term "approximately" is not consistently repeated when referring to conditions based on degrees below. However, reference to a condition based on a degree (e.g., "if the rotation direction angle is 90 degrees . . . ") can be a reference to an approximate degree.

Moreover, the description of processes below refers to conditions based on various degree thresholds (e.g., 0, 90, and 180 degrees). In various implementations, the thresholds may reflect conditions based on when a rotation direction angle is closer to a given threshold than to other thresholds. For example, if a mobile terminal is described as being at a first condition at 0 degrees and a second condition at 90 degrees, a rotation direction angle of 30 degrees can be considered with respect to the first condition because 30 degrees is closer to 0 degrees than to 90 degrees. In various other implementations, the thresholds may reflect conditions based on when a rotation direction angle is equal to or greater than the threshold.

If the rotation direction angle is 0 degrees, a first control signal for selecting a first telephone receiver can be generated (S14). In particular, when the rotation direction angle of the mobile terminal sensed by the sensing unit 310 is 0 degrees, the controller 320 generates a first control signal for selecting the first telephone transceiver 360 and outputs the generated first control signal to the switching unit 380. For example, when the rotation direction angle of the mobile terminal sensed by the sensing unit 310 is 0 degrees, the controller 320 generates the first control signal for selecting the first telephone transceiver 360 based on the look-up table previously stored in the storage unit 350.

Generation of first and second control signals for selecting a first telephone transceiver 360 and a second telephone transceiver 370 is described below.

Figures 5, 6:
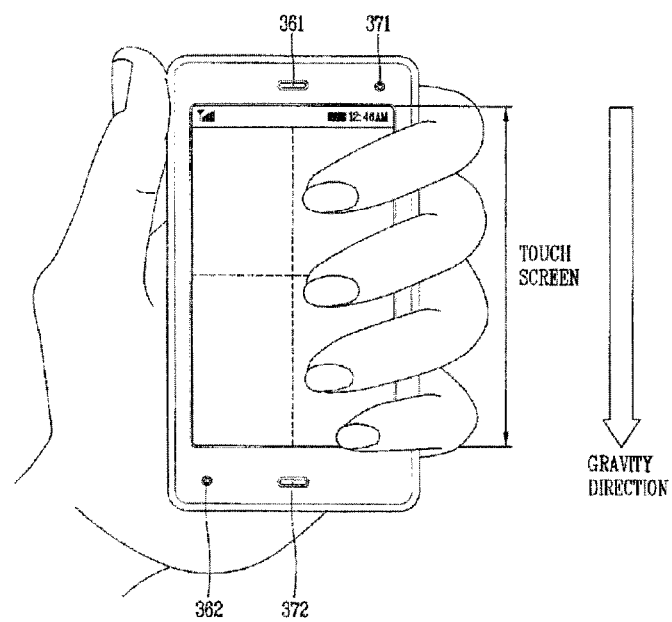
FIG. 5 illustrates a telephone transceiver of a mobile terminal.
FIG. 6 illustrates a lookup table for controlling a telephone transceiver based on a rotation direction of a mobile terminal.

FIG. 5 illustrates a telephone transceiver of a mobile terminal. As shown in FIG. 5, the telephone transceiver includes a first telephone transceiver 360 including a first speaker 361 and a first microphone 362 and a second telephone transceiver 370 including a second microphone 371 and a second speaker 372. The first speaker 361 is installed at an upper end portion of the mobile terminal. The first microphone 362 is installed at a lower end portion of the mobile terminal. The second speaker 372 is installed at the lower end portion of the mobile terminal. The second microphone 371 is to installed at the upper end portion of the mobile terminal.

FIG. 6 illustrates a lookup table for controlling a telephone transceiver based on a rotation direction angle of a mobile terminal. As shown in FIGS. 5 and 6, when the rotation direction angle of the mobile terminal sensed by the sensing unit 310 is 0 degrees, the controller 320 generates a first control signal for turning on the first speaker 361 and the first microphone 362 of the first telephone transceiver 360 based on the look-up table and outputs the generated first control signal to the switching unit 380.

A first speaker and a first microphone are turned on based on a first control signal (S15). In particular, in the mobile terminal, the switching unit 380 turns on the first speaker 361 and the first microphone 362 of the first telephone transceiver 360 based on the first control signal. Thereafter, the second microphone and the second speaker are turned off (S16). In particular, when the rotation direction angle of the mobile terminal is 0 degrees, the controller 320 turns off the second speaker 372 and the second microphone 371 of the second telephone transceiver 360 through the switching unit 380 based on the look-up table. Turning off a component (e.g., a speaker or microphone) can include removing power from the component or switching from a mode where input from the component is utilized to a mode where input from the component is not utilized. This process can enable a user to more easily perform call communication through the first telephone transceiver 360 when the mobile terminal has not been rotated.

Whether a rotation direction angle is 180 degrees is determined (S17). In particular, when the rotation direction angle of the mobile terminal sensed by the sensing unit 310 is not 0 degrees, the controller 320 determines whether or not the rotation direction angle of the mobile terminal is 180 degrees. When the rotation direction angle of the mobile terminal is 180 degrees, the mobile terminal is maintained upside down. Here, 90 degrees may be set as a threshold value. In various implementations, when the rotation direction angle of the mobile terminal is 90 degrees or larger, the controller 320 may regard the rotation direction angle of the mobile terminal as 180 degrees, while if the rotation direction angle of the mobile terminal is smaller than 90 degrees, the controller may regard the rotation direction angle of the mobile terminal as 0 degree. If the rotation direction angle is 180 degrees, a second control signal for selecting a second telephone receiver can be generated (S18). In particular, when the rotation direction angle of the mobile terminal sensed by the sensing unit 310 is 180 degrees, the controller 320 generates a second controls signal for selecting the second telephone transceiver 370 and outputs the second control signal to the switching unit 380. For example, when the rotation direction angle of the mobile terminal sensed by the sensing unit 310 is 180 degrees, the controller generates the second control signal for selecting the second telephone transceiver 360 based on the look-up table previously stored in the storage unit 350. Namely, when the rotation direction angle of the mobile terminal sensed by the sensing unit 310 is 180 degrees, the controller 320 generates the second control signal for turning on the second speaker 372 and the second microphone 371 of the second telephone transceiver 360 based on the look-up table, and outputs the generated second control signal to the switching unit 380.

A second speaker and a second microphone are turned on based on a second control signal (S19). In particular, the switching unit 380 turns on the second speaker 372 and the second microphone 371 of the second telephone transceiver 370 based on the second control signal. Thereafter, the first microphone and the first speaker are turned off (S20). In particular, when the rotation direction angle of the mobile terminal is 180 degrees, the controller 320 turns off the first speaker 361 and the first microphone 362 of the first telephone transceiver 360 through the switching unit 380 based on the look-up table.

Accordingly, even when the mobile terminal is maintained upside down by the user, the user can perform call communication through the second telephone transceiver 370 and may not be required having to rotate the mobile terminal. In addition, when the first telephone transceiver 360 or the second telephone transceiver 370 is selected in the phone call mode, the controller 320 can perform call communication until call termination through the selected telephone transceiver, so that the user can perform call communication notwithstanding moves in various directions during the call communication.

Figure 7:
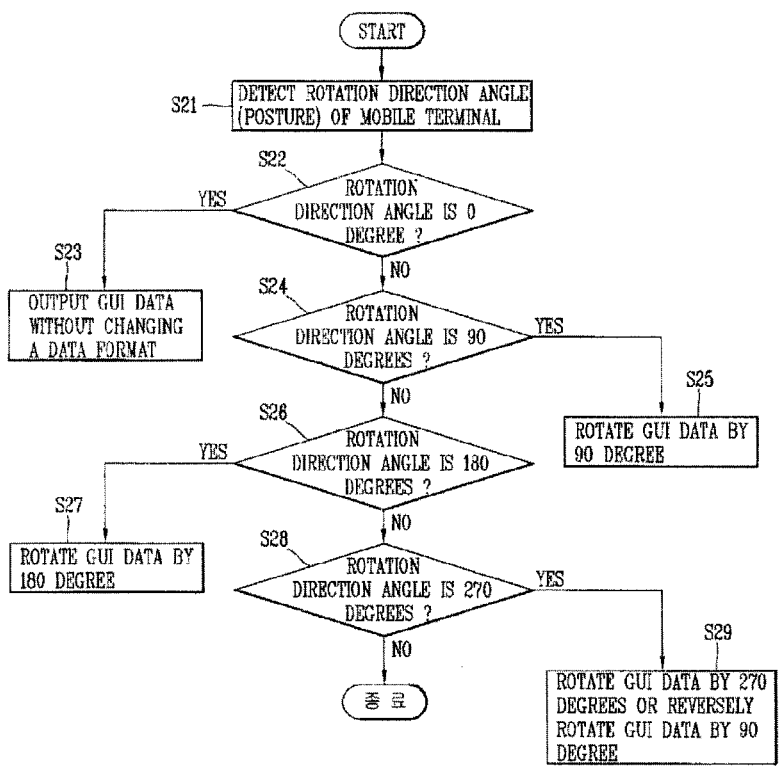
FIG. 7 is a flow chart of a second process for controlling a mobile terminal

FIG. 7 is a flow chart of a second process for controlling a mobile terminal. First, a rotation direction angle of a mobile terminal is detected (S21). In particular, the sensing unit 310 senses the posture of the mobile terminal by detecting a rotation direction angle of the mobile terminal. For example, the sensing unit 310 can sense the posture of the mobile terminal by sensing a rotation direction angle of the mobile terminal through a three-axis accelerometer that measures the three-axis acceleration of X, Y, and Z axes. The three-axis accelerometer is installed at a lower end of the right portion of the mobile terminal, and senses first to fourth directions of the mobile terminal based on the direction information of X, Y, and Z axes. The first direction may be 0 degrees, the second direction may be 90 degrees, the third direction may be 180 degrees, and the fourth direction may be 270 degrees.

Then, whether a rotation direction angle is 0 degrees is determined (S22). In particular, the controller 320 determines whether the rotation direction angle of the mobile terminal is 0 degrees based on the rotation direction angle of the mobile terminal sensed by the sensing unit 310. If the rotation direction angle is 0 degrees, GUI data is output without changing the data format (S23). Changing the data format can refer to altering the data, such that GUI is shown in a different angle, direction, or otherwise in a different manner. In particular, when the rotation direction angle of the mobile terminal is 0 degrees, the mobile terminal has not been rotated.

The controller 320 outputs GUI data in a forward direction based on the rotation direction angle of the mobile terminal. For example, when the rotation direction angle of the mobile terminal sensed by the sensing unit 310 is 0 degrees, the controller 320 outputs GUI data to the display unit 340 through the image processing unit 330. In this case, when the rotation direction angle of the mobile terminal is 0 degrees, the image processing unit 330 outputs the GUI data to the display unit 340 without changing its format (e.g., it outputs the GUI data without rotating it). Here, the GUI data can include video, a still image, characters, symbols, numbers, or other information. Then, whether a rotation direction angle is 90 degrees is determined (S24). If the rotation direction angle is 90 degrees, GUI data is rotated by 90 degrees (S25). In particular, when the rotation direction angle of the mobile terminal sensed by the sensing unit 310 is 90 degrees, the controller 320 reversely rotates the GUI data by 90 degrees counterclockwise through the image processing unit 330 and outputs the same to the display unit 340. Namely, when the rotation direction angle of the mobile terminal is 90 degrees (clockwise), the controller 320 reversely rotates the GUI data by 90 degrees counterclockwise to display the GUI data in the forward direction on the display unit 340. Accordingly, although the mobile terminal is tilted by 90 degrees, the user can view the GUI data in the forward direction.

Next, whether a rotation direction angle is 180 degrees is determined (S26). If the rotation direction angle is 180 degrees, GUI data is rotated by 180 degrees (S27). In particular, when the rotation direction angle of the mobile terminal sensed by the sensing unit 310 is 180 degrees, the controller 320 rotates the GUI data by 180 degrees counterclockwise or clockwise through the image processing unit 330 and outputs the same to the display unit 340. Namely, when the rotation direction angle of the mobile terminal is 180 degrees (clockwise), the controller 320 rotates the GUI data by 180 degrees counterclockwise to display the GUI data in the forward direction on the display unit 340. Accordingly, although the mobile terminal is tilted by 180 degrees, the user can view the GUI data in the forward direction.

Then, whether a rotation direction angle is 270 degrees is determined (S28). If the rotation direction angle is 270 degrees, GUI data is rotated by 270 degrees (S29). In particular, when the rotation direction angle of the mobile terminal sensed by the sensing unit 310 is 270 degrees, the controller 320 rotates the GUI data by 270 degrees counterclockwise or by 90 degrees clockwise through the image processing unit 330 and outputs the same to the display unit 340. Namely, when the rotation direction angle of the mobile terminal is 270 degrees (clockwise), the controller 320 rotates the GUI data by 270 degrees counterclockwise or by 90 degrees clockwise to display the GUI data in the forward direction on the display unit 340. Accordingly, although the mobile terminal is tilted by 270 degrees, the user can view the GUI data in the forward direction.

Meanwhile, the apparatus for controlling the mobile terminal may detect the posture of the mobile terminal by using various posture detection devices as well as the three-axis accelerometer. Various exemplary implementation involving detection of a posture of a mobile terminal with a three-axis accelerometer are described below.

Figure 8:
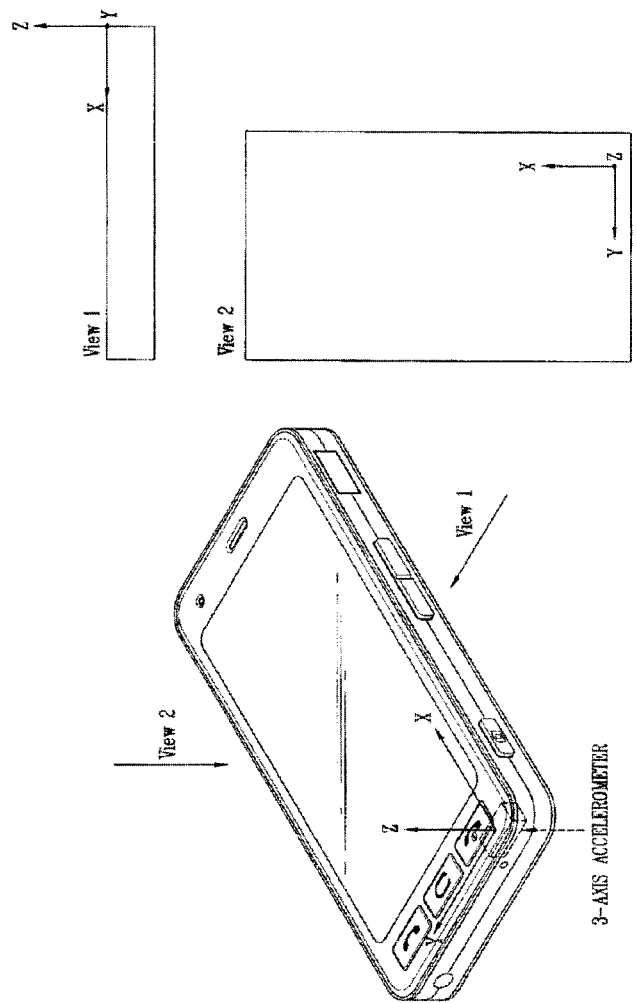
FIG. 8 illustrates a three-axis accelerometer in a mobile terminal.

FIG. 8 illustrates a three-axis accelerometer in a mobile terminal. As shown in FIG. 8, the three-axis accelerometer is installed at the lower end of the right portion of the mobile terminal and indicates the x-axis, y-axis, and z-axis directions. For example, when the mobile terminal is rotated in a horizontal direction or in a vertical direction, the controller 320 may automatically change UI data (screen image) to a horizontal screen image or a vertical screen image. In addition, when the mobile terminal is reversed (i.e., when the screen of the mobile terminal points toward the bottom), the controller 320 may change an active mode of the mobile terminal into a standby mode.

Figure 9:
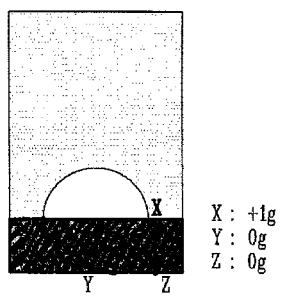
FIG. 9 illustrates a posture of a mobile terminal when a rotation direction angle of the mobile terminal is 0 degrees.

FIG. 9 illustrates a posture of a mobile terminal when a rotation direction angle of the mobile terminal is 0 degrees. As shown in FIG. 9, when the rotation direction angle of the mobile terminal is 0 degrees, UI data of the mobile terminal is outputted in the vertical direction of the mobile terminal. Namely, when the rotation direction angle of the mobile terminal is 0 degrees, the controller 320 outputs the UI data of the mobile terminal in the vertical direction of the mobile terminal to the display unit 340 through the image processing unit 330. In this case, an output value of the three-axis accelerometer is (X axis: +1 g, Y axis: 0 g, and Z axis: 0 g). Here, the output value of the three-axis accelerometer is merely an example. That is, the output range of three-axis accelerometers may vary and a start point may differ depending on the position of the three-axis accelerometer within the mobile terminal.

Figure 10:
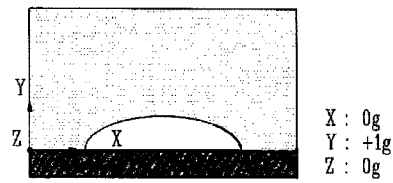
FIG. 10 illustrates a posture of a mobile terminal when a rotation direction angle of the mobile terminal is 90 degrees.

FIG. 10 illustrates a posture of mobile terminal when a rotation direction angle of the mobile terminal is 90 degrees. As shown in FIG. 10, when the rotation direction angle of the mobile terminal is 90 degrees (clockwise), UI data of the mobile terminal is outputted in the horizontal direction of the mobile terminal. Namely, when the user rotates the mobile terminal by 90 degrees clockwise, the controller 320 outputs the UI data of the mobile terminal in the horizontal direction of the mobile terminal to the display unit 340 through the image processing unit 330. In this case, an output value of the three-axis accelerometer is (X axis: 0 g, Y axis: +1 g, and Z axis: 0 g). Here, the output value of the three-axis accelerometer is merely an example. That is, the output range of three-axis accelerometers may vary and a start point may differ depending on the position of the three-axis accelerometer within the mobile terminal.

Figure 11:
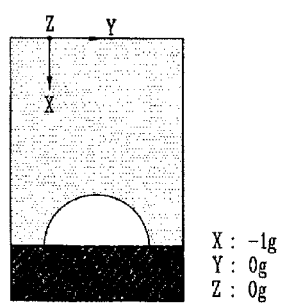
FIG. 11 illustrates a posture of a mobile terminal when a rotation direction angle of the mobile terminal is 180 degrees.

FIG. 11 illustrates a posture of mobile terminal when a rotation direction angle of the mobile terminal is 180 degrees. As shown in FIG. 11, when the rotation direction angle of the mobile terminal is 180 degrees (clockwise), UI data of the mobile terminal is rotated by 180 degrees clockwise or counterclockwise so as to be outputted. Namely, when the user rotates the mobile terminal by 180 degrees clockwise, the controller 320 rotates the UI data of the mobile terminal by 180 degrees through the image processing unit 330 and outputs the 180-degree rotated UI data to the display unit 340. In this case, an output value of the three-axis accelerometer is (X axis: −1 g, Y axis: 0 g, and Z axis: 0 g). Here, the output value of the three-axis accelerometer is merely an example. That is, the output range of three-axis accelerometers may vary and a start point may differ depending on the position of the three-axis accelerometer within the mobile terminal.

Figure 12:
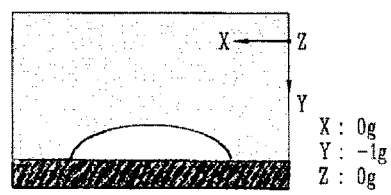
FIG. 12 illustrates a posture of a mobile terminal when a rotation direction angle of the mobile terminal is 270 degrees.

FIG. 12 illustrates a posture of a mobile terminal when a rotation direction angle of the mobile terminal is 270 degrees. As shown in FIG. 12, when the rotation direction angle of the mobile terminal is 270 degrees (clockwise), UI data of the mobile terminal is rotated by 90 degrees clockwise or by 270 degrees counterclockwise so as to be outputted. Namely, when the user rotates the mobile terminal by 270 degrees clockwise, the controller 320 reversely rotates the UI data of the mobile terminal by 270 degrees through the image processing unit 330 and outputs the 270-degree reversely rotated UI data to the display unit 340. In this case, an output value of the three-axis accelerometer is (X axis: 0 g, Y axis: −1 g, and Z axis: 0 g). Here, the output value of the three-axis accelerometer is merely an example. That is, the output range of three-axis accelerometers may vary and a start point may differ depending on the position of the three-axis accelerometer within the mobile terminal. In addition, threshold values of the three-axis accelerometer may be set as 45 degrees, 135 degrees, 225 degrees, and 315 degrees.

Figure 13:
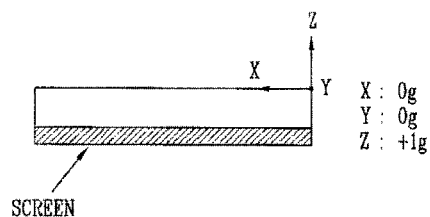
FIG. 13 illustrates a posture of a mobile terminal when a screen of the mobile to terminal faces a downward or gravitational direction.

FIG. 13 illustrates a posture of a mobile terminal when a screen of the mobile terminal faces a downward or gravitational direction. As shown in FIG. 13, when the screen of the mobile terminal faces in the direction of gravity, the mobile terminal is changed to the standby mode. Namely, when the user places mobile terminal in the direction of gravity, the controller 320 changes the active mode of the mobile terminal to the standby mode. In this case, an output value of the three-axis accelerometer is (X axis: 0 g, Y axis: 0 g, and Z axis: +1 g). Here, the output value of the three-axis accelerometer is merely an example. That is, the output range of three-axis accelerometers may vary and a start point may differ depending on the position of the three-axis accelerometer within the mobile terminal.

Figure 14:
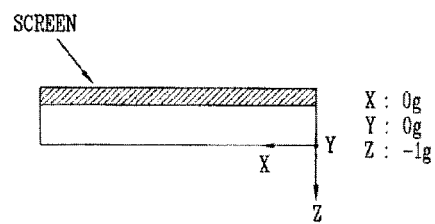
FIG. 14 illustrates a posture of a mobile terminal when a screen of the mobile terminal faces in an upward or against gravitational direction.

FIG. 14 illustrates a posture of a mobile terminal when a screen of the mobile terminal faces an upward or against gravitational direction. As shown in FIG. 14, when the screen of the mobile terminal faces in the direction which is against gravity, the mobile terminal is changed to the active mode. Namely, when the user places the mobile terminal faces in the direction against gravity, the controller 320 changes the mobile terminal to the active mode. In this case, an output value of the three-axis accelerometer is (X axis: 0 g, Y axis: 0 g, and Z axis: −1 g). Here, the output value of the three-axis accelerometer is merely an example. That is, the output range of three-axis accelerometers may vary and a start point may differ depending on the position of the three-axis accelerometer within the mobile terminal.

Figure 15:
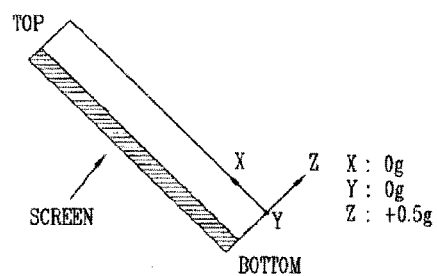
FIG. 15 illustrates a posture of a mobile terminal when a rotation direction angle of the mobile terminal is −45 degrees.

FIG. 15 illustrates a posture of a mobile terminal when a rotation direction angle of the mobile terminal is −45 degrees. As shown in FIG. 15, when the rotation direction angle of the mobile terminal is −45 degrees (counterclockwise), the UI data of the mobile terminal is reversely rotated by 45 degrees clockwise so as to be outputted. Namely, when the user rotates the mobile terminal by 45 degrees counterclockwise, the controller 320 reversely rotates the UI data of the mobile terminal by 45 degrees through the image processing unit 330, and outputs the 45-degree reversely rotated UI data to the display unit 340. In this case, an output value of the three-axis accelerometer is (X axis: 0 g, Y axis: 0 g, and Z axis: +0.5 g). Here, the output value of the three-axis accelerometer is merely an example. That is, the output range of three-axis accelerometers may vary and a start point may differ depending on the position of the three-axis accelerometer within the mobile terminal.

Figure 16:
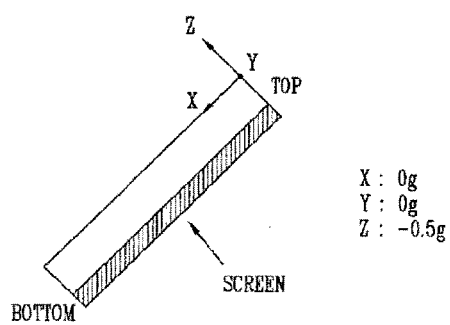
FIG. 16 illustrates a posture of a mobile terminal when a rotation direction angle of the mobile terminal is +45 degrees.

FIG. 16 illustrates a posture of a mobile terminal when a rotation direction angle of the mobile terminal is +45 degrees. As shown in FIG. 16, when the rotation direction angle of the mobile terminal is 45 degrees (clockwise), the UI data of the mobile terminal is rotated by 45 degrees counterclockwise or rotated by 315 degrees clockwise so as to be outputted. Namely, when the user rotates the mobile terminal by 45 degrees clockwise, the controller 320 reversely rotates the UI data of the mobile terminal by 45 degrees through the image processing unit 330, and outputs the 45-degree reversely rotated UI data to the display unit 340. In this case, an output value of the three-axis accelerometer is (X axis: 0 g, Y axis: 0 g, and Z axis: −0.5 g). Here, the output value of the three-axis accelerometer is merely an example. That is, the output range of three-axis accelerometers may vary and a start point may differ depending on the position of the three-axis accelerometer within the mobile terminal. In addition, in order to detect the rotation direction angles of +45 and −45, a 90-degree threshold value may be additionally set for the z axis of the three-axis accelerometer.

Figure 17:
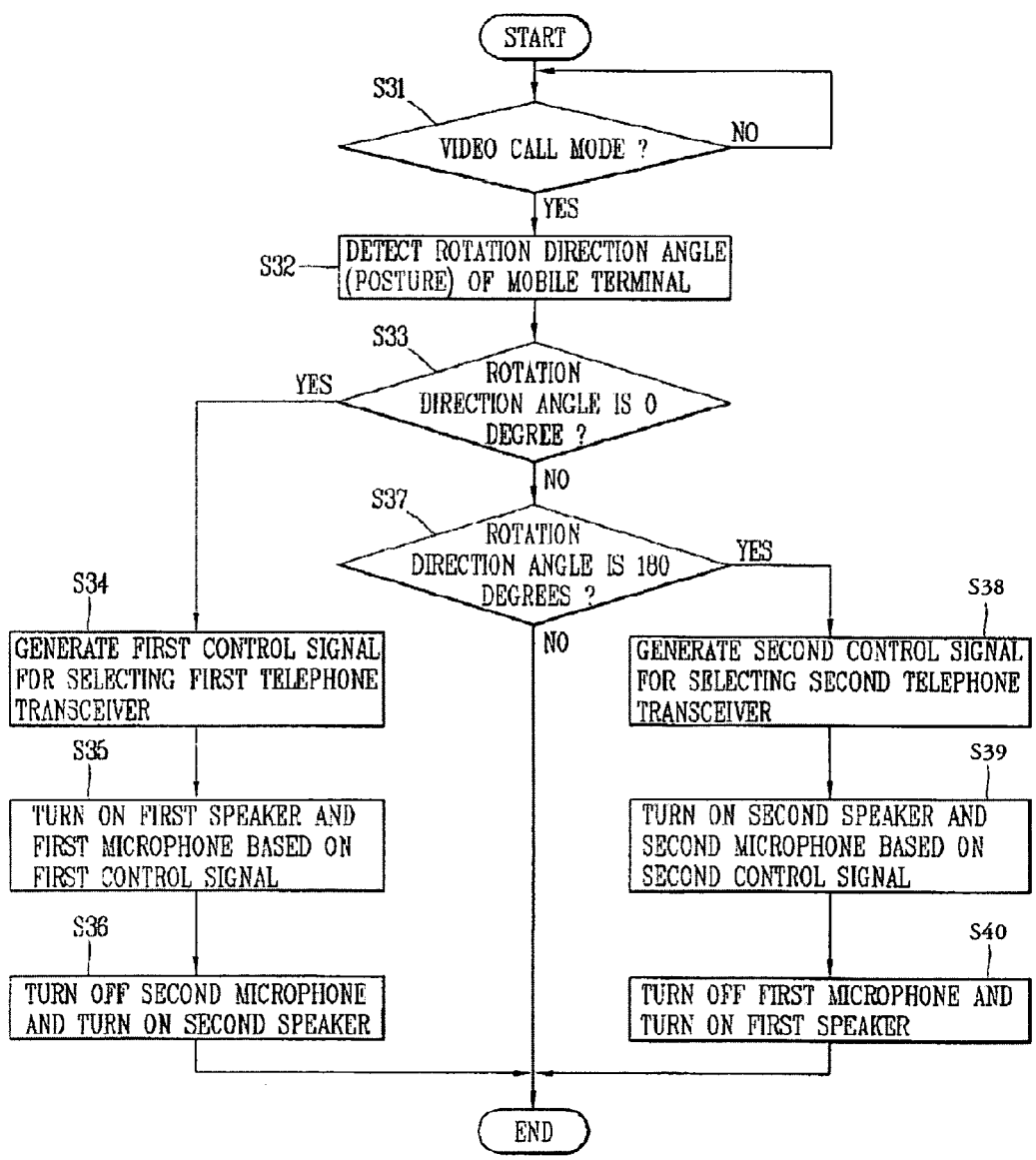
FIG. 17 is a flow chart of a third process for controlling a mobile terminal.

FIG. 17 is a flow chart of a third process for controlling a mobile terminal. First, whether a mode is in a video call mode is determined (S31). In particular, the controller 320 determines whether the mobile terminal is in a video call mode. For example, the controller 320 determines whether a video call key has been selected by the user or whether a video call signal has been received. Here, the mobile terminal may be a full touch mobile communication terminal in which a video call key and a key pad (e.g., keys corresponding to numbers, characters and symbols) can be selected from a touch screen.

Next, a rotation direction angle of a mobile terminal is detected (S32). In particular, when the mobile terminal is in the video call mode, the sensing unit 310 senses the posture of the mobile terminal by detecting a rotation direction angle of the mobile terminal under the control of the controller 320. For example, the sensing unit 310 can sense the posture of the mobile terminal by sensing a rotation direction angle of the mobile terminal through a three-axis accelerometer that measures the three-axis acceleration of X, Y, and Z axes.

Then, whether a rotation direction angle is approximately 0 degrees is determined (S33). In particular, the controller 320 determines whether the rotation direction angle of the mobile terminal is 0 degrees based on the rotation direction angle of the mobile terminal sensed by the sensing unit 310. When the rotation direction angle of the mobile terminal is 0 degrees, it means that the mobile terminal has not been rotated.

If the rotation direction angle is 0 degrees, a first control signal for selecting a first telephone receiver can be generated (S34). In particular, when the rotation direction angle of the mobile terminal sensed by the sensing unit 310 is 0 degrees, the controller 320 generates a first control signal for selecting the first telephone transceiver 360 and outputs the generated first control signal to the switching unit 380. For example, when the rotation direction angle of the mobile terminal sensed by the sensing unit 310 is 0 degrees, the controller 320 generates the first control signal for selecting the first telephone transceiver 360 based on the look-up table previously stored in the storage unit 350.

Generation of first and second control signals for selecting a first telephone transceiver 360 and a second telephone transceiver 370 is described below.

Figures 18, 19:
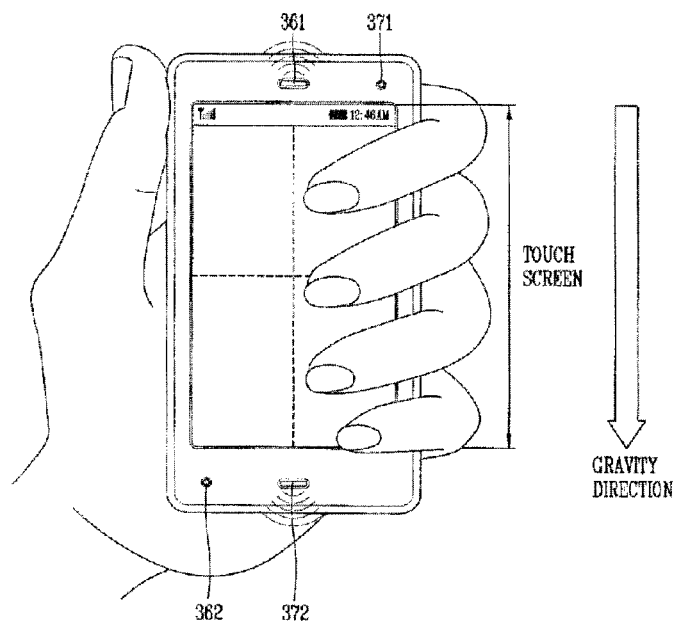
FIG. 18 illustrates a telephone transceiver of a mobile terminal.
FIG. 19 illustrates a lookup table for controlling a telephone transceiver based on a rotation direction of a mobile terminal.

FIG. 18 illustrates a telephone transceiver of a mobile terminal. As shown in FIG. 18, the telephone transceiver includes the first telephone transceiver 360 including the first speaker 361 and the first microphone 362 and the second telephone transceiver 370 including the second microphone 371 and the second speaker 372. The first speaker 361 is installed at an upper end portion of the mobile terminal. The first microphone 362 is installed at a lower end portion of the mobile terminal. The second speaker 372 is installed at the lower end portion of the mobile terminal. The second microphone 371 is installed at the upper end portion of the mobile terminal.

FIG. 19 illustrates a lookup table for controlling a telephone transceiver based on a rotation direction of a mobile terminal. As shown in FIGS. 18 and 19, when the rotation direction angle of the mobile terminal sensed by the sensing unit 310 is 0 degrees, the controller 320 generates a first control signal for turning on the first speaker 361 and the first microphone 362 of the first telephone transceiver 360 based on the look-up table and outputs the generated first control signal to the switching unit 380.

A first speaker and a first microphone are turned on based on a first control signal (S35). In particular, in the mobile terminal, the switching unit 380 turns on the 5 first speaker 361 and the first microphone 362 of the first telephone transceiver 360 based on the first control signal. Thereafter, the second microphone is turned off and the second speaker is turned on (S36). In particular, when the rotation direction angle of the mobile terminal is 0 degrees, the controller 320 turns on the second speaker 372 of the second telephone transceiver 360 and turns off the second microphone 371 of the second telephone transceiver 360 through the switching unit 380 based on the look-up table. This process can enable a user to more easily hear the voice of a speaker by operating the first and second speakers (in a stereo mode).

Whether a rotation direction angle is 180 degrees is determined (S37). In particular, when the rotation direction angle of the mobile terminal sensed by the sensing unit 310 is not 0 degrees, the controller 320 determines whether or not the rotation direction angle of the mobile terminal is 180 degrees. When the rotation direction angle of the mobile terminal is 180 degrees, the mobile terminal is maintained upside down. Here, 90 degrees may be set as a threshold value. In various implementation, when the rotation direction angle of the mobile terminal is 90 degrees or larger, the controller 320 may regards the rotation direction angle of the mobile terminal as 180 degrees, while if the rotation direction angle of the mobile terminal is smaller than 90 degrees, the controller may regards the rotation direction angle of the mobile terminal as 0 degree.

If the rotation direction angle is 180 degrees, a second control signal for selecting a second telephone receiver can be generated (S38). In particular, when the rotation direction angle of the mobile terminal sensed by the sensing unit 310 is 180 degrees, the controller 320 generates a second controls signal for selecting the second telephone transceiver 370 and outputs the second control signal to the switching unit 380. For example, when the rotation direction angle of the mobile terminal sensed by the sensing unit 310 is 180 degrees, the controller generates the second control signal for selecting the second telephone transceiver 360 based on the look-up table previously stored in the storage unit 350. Namely, when the rotation direction angle of the mobile terminal sensed by the sensing unit 310 is 180 degrees, the controller 320 generates the second control signal for turning on the second speaker 372 and the second microphone 371 of the second telephone transceiver 360 based on the look-up table, and outputs the generated second control signal to the switching unit 380.

A second speaker and a second microphone are turned on based on a second control signal (S39). In particular, the switching unit 380 turns on the second speaker 372 and the second microphone 371 of the second telephone transceiver 370 based on the second control signal. Thereafter, the first microphone is turned off and the first speaker is turned on (S40). In particular, when the rotation direction angle of the mobile terminal is 180 degrees, the controller 320 turns on the first speaker 361 of the first telephone transceiver 360 and turns off the first microphone 362 of the first telephone transceiver 360 through the switching unit 380 based on the look-up table.

Accordingly, even when the mobile terminal is maintained upside down by the user, the user can hear the voice of the speaker by operating both the first and second speakers (in the stereo mode) when video call communication is performed.

Figure 20:
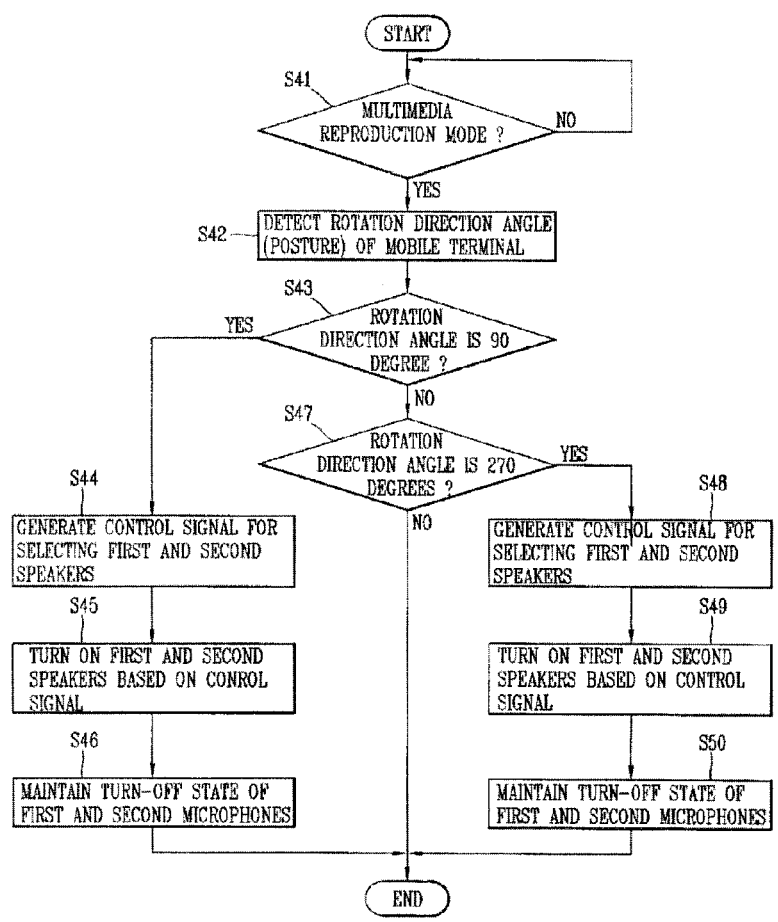
FIG. 20 is a flow chart of a fourth process for controlling a mobile terminal.

FIG. 20 is a flow chart of a fourth process for controlling a mobile terminal. First, whether a mode is in a multimedia reproduction mode is determined (S41). In particular, in the mobile terminal, the controller 320 determines whether or not the mobile terminal is in a multimedia data reproduction mode. For example, the controller 320 determines whether or not a multimedia reproduction key has been selected by the user.

Next, a rotation direction angle of a mobile terminal is detected (S42). In particular, when the mobile terminal is in the multimedia reproduction mode, the sensing unit 310 senses a rotation direction angle of the mobile terminal under the control of the controller 320, to thereby detect the posture of the mobile terminal. For example, the sensing unit 310 can sense the posture of the mobile terminal by sensing a rotation direction angle of the mobile terminal through a three-axis accelerometer that measures the three-axis acceleration of X, Y, and Z axes.

Then, whether a rotation direction angle is 90 degrees is determined (S43). In particular, the controller 320 determines whether the rotation direction angle of the mobile terminal is 90 degrees based on the rotation direction angle of the mobile terminal sensed by the sensing unit 310. The mobile device can be configured such that a rotation direction angle of 90 degrees indicates that the mobile terminal has been rotated 90 degrees. When the rotation direction angle of the mobile terminal is 90 degrees, it means that the mobile terminal has been rotated by 90 degrees.

If the rotation direction angle is 90 degrees, a control signal for selecting a first speaker and a second speaker can be generated (S44). In particular, when the rotation direction angle of the mobile terminal sensed by the sensing unit 310 is 90 degrees, the controller 320 generates a control signal for selecting the first speaker 361 and the second speaker 372, and outputs the control signal to the switching unit 380. For example, when the rotation direction angle of the mobile terminal sensed by the sensing unit 310 is 90 degrees, the controller 320 generates the control signal for selecting the first speaker 361 and the second speaker 372 based on a look-up table previously stored in the storage unit 350.

Generation of the control signal for selecting a first speaker 361 and a second speaker 372 is described below.

Figures 21, 22:
FIG. 21 illustrates a speaker of a mobile terminal.
FIG. 22 illustrates a lookup table for controlling a telephone transceiver based on a rotation direction of a mobile terminal.

FIG. 21 illustrates a speaker of a mobile terminal. As shown in FIG. 21, the first speaker 361 and the second speaker 372 of the mobile terminal operate when the rotation direction angle of the mobile terminal is 90 degrees or 180 degrees. Here, the first speaker 361 and the second speaker 372 of the mobile terminal may operate when the rotation direction angle of the mobile terminal is 0 degrees or 180 degrees.

FIG. 22 illustrates a lookup table for controlling a telephone transceiver based on a rotation direction angle of a mobile terminal. As shown in FIGS. 21 and 22, when the rotation direction angle of the mobile terminal sensed by the sensing unit 310 is 90 degrees, the controller 320 generates a control signal for turning on the first speaker 361 and the second speaker 372 based on the look-up table, and outputs the generated control signal to the switching unit 380.

A first speaker and a second speaker are turned on based on the control signal (S45). In particular, in the mobile terminal, the switching unit 380 turns on the first speaker 361 and the second speaker 372 based on the control signal. Thereafter, an off state of the first and second microphones is maintained (S46). In particular, when the rotation direction angle of the mobile terminal is 90 degrees, the controller 320 maintains the turn-off state of the first microphone 362 and the second microphone 371 through the switching unit 380 based on the look-up table.

Accordingly, when the mobile terminal is in the multimedia reproduction mode, the user can hear audio signals of the multimedia data as stereo sound by operating the first and second speakers.

Whether a rotation direction angle is 270 degrees is determined (S47). In particular, when the rotation direction angle of the mobile terminal sensed by the sensing unit 310 is not 90 degrees, the controller 320 determines whether or not the rotation direction angle of the mobile terminal is 270 degrees.

If the rotation direction angle is 270 degrees, a control signal for selecting a first speaker and a second speaker is generated (S48). In particular, when the rotation direction angle of the mobile terminal sensed by the sensing unit 310 is 270 degrees, the controller 320 generates a control signal for selecting the first speaker 361 and the second speaker 372 and outputs the generated control signal to the switching unit 380. For example, when the rotation direction angle of the mobile terminal sensed by the sensing unit 310 is 270 degrees, the controller 320 generates the control signal for selecting the first speaker 361 and the second speaker 372 based on the look-up table previously stored in the storage unit 350 and outputs the generated control signal to the switching unit 380.

A first speaker and a second speaker are turned on based on the control signal (S49). In particular, in the mobile terminal, the switching unit 380 turns on the first speaker 361 and the second speaker 372 based on the control signal. Thereafter, an off state of the first and second microphones is maintained (S50). In particular, when the rotation direction angle of the mobile terminal is 270 degrees, the controller 320 maintains the turn-off state of the first microphone 362 and the second microphone 371 through the switching unit 380 based on the look-up table.

Accordingly, when the mobile terminal is in the multimedia reproduction mode, the user can hear audio signals of the multimedia data as stereo sound by operating the first and second speakers.

The first telephone transceiver 360 and the second telephone transceiver 370 can be installed at various positions of the mobile terminal. The first telephone transceiver and the second telephone transceiver installed at various positions of the mobile terminal is described below with respect to FIGS. 23 to 25.

Figure 23:
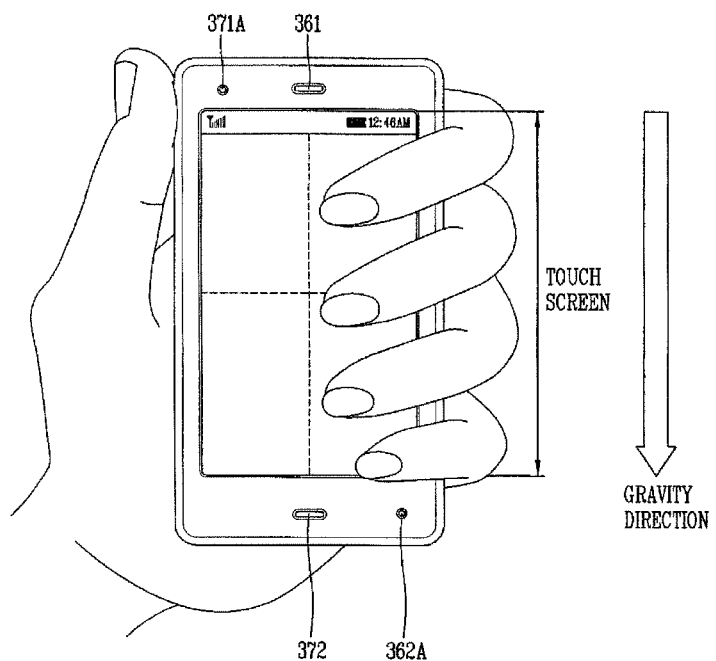
FIG. 23 illustrates telephone transceivers installed at a mobile terminal.

FIG. 23 illustrates telephone transceivers installed at a mobile terminal. As shown in FIG. 23, telephone transceivers include a first telephone transceiver 360 including the first speaker 361 and a first microphone 362A and a second telephone transceiver 370 including a second microphone 371A and the second speaker 372. The first speaker 361 is installed in the middle of the upper end portion of the mobile terminal. The first microphone 362A is installed at a right portion of the lower end portion of the mobile terminal. The second speaker 372 is installed at the central portion of the lower end portion of the mobile terminal. The second microphone 371A is installed at a left portion of the upper end portion of the mobile terminal.

Figure 24:
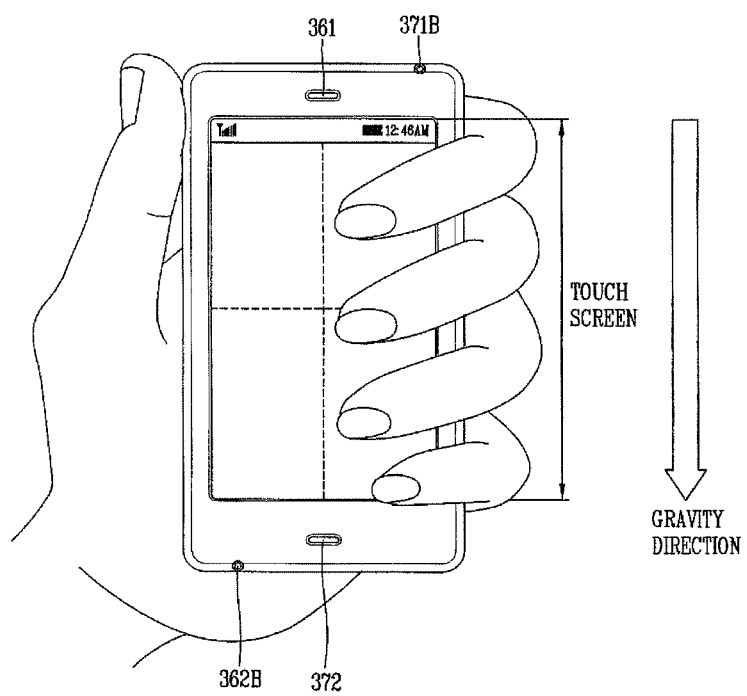
FIGS. 24 and 25 illustrate telephone transceivers installed at different positions of a mobile terminal.

FIG. 24 illustrates telephone transceivers installed at different positions of a mobile terminal. As shown in FIG. 24, the telephone transceivers include a first telephone transceiver 360 including the first speaker 361 and a first microphone 362B and a second telephone transceiver 370 including a second microphone 371B and the second speaker 372. Here, the first speaker 361 is installed in the middle of the upper end portion of the mobile terminal. The first microphone 362B is installed at the left portion of the bottom surface of the mobile terminal. The second speaker 372 is installed at the central portion of the lower end portion of the mobile terminal. The second microphone 371B is installed at the right portion of the upper end portion of the mobile terminal. The first microphone 372A may be installed at the right portion or central portion of the bottom surface of the mobile terminal. In addition, the second microphone 371B may be installed at the left portion or the central portion of the mobile terminal.

Figure 25:
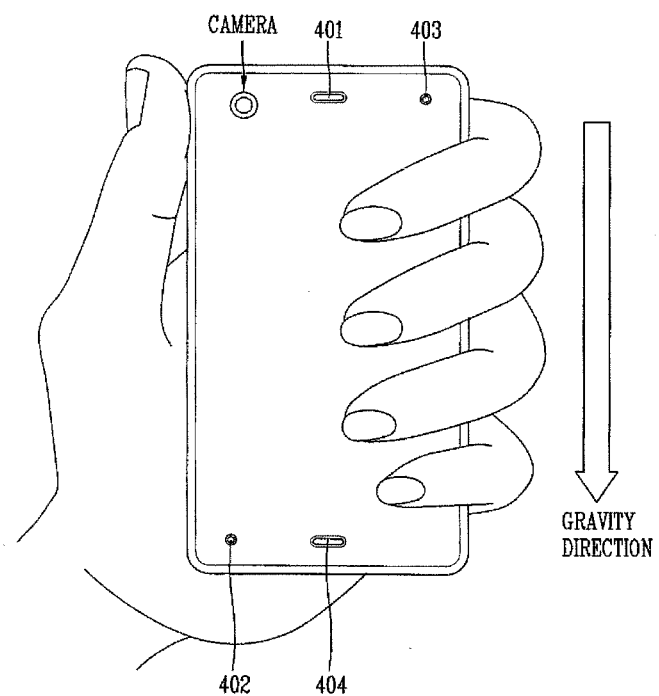

FIG. 25 illustrates telephone transceivers installed at different positions of a mobile terminal. As shown in FIG. 25, the telephone transceivers include a third telephone transceiver including a third speaker 401 and a third microphone 402 and a fourth telephone transceiver including a fourth microphone 403 and a fourth speaker 404. Here, the third speaker 401 is installed in the middle of the upper end portion on a rear surface of the mobile terminal. The third microphone 402 is installed at the left portion of the lower end portion on the rear surface of the mobile terminal.

The fourth speaker 404 is installed at the central portion of the lower end portion on the rear surface of the mobile terminal. The fourth microphone 403 is installed at the right portion of the upper end portion on the rear surface of the mobile terminal. The third microphone 402 may be installed at the right portion or central portion of the lower end on the rear surface of the mobile terminal. In addition, the second microphone 403 may be installed at the left portion or the central portion on the rear surface of the mobile terminal.

Accordingly, the mobile terminal can perform call communication in various directions through the telephone transceivers installed on the front surface of the mobile terminal or through the telephone transceivers installed on the rear surface of the mobile terminal.

Hereinafter, an apparatus and method for controlling a mobile terminal so as to capture a user desired image (e.g., a two-dimensional (2D) or three-dimensional (3D) image) by automatically capturing the 2D or 3D stereoscopic image according to the posture of the mobile terminal is described below with respect to FIGS. 26 to 31.

Figure 26:
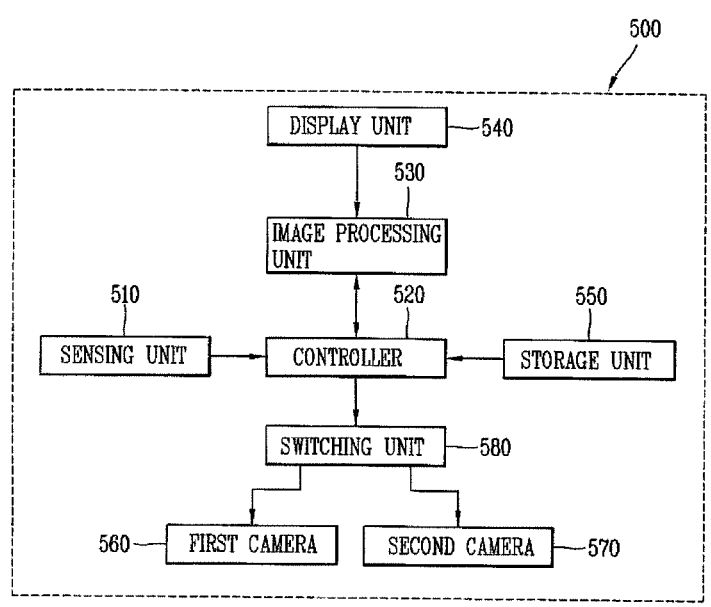
FIG. 26 is a schematic block diagram showing a configuration of an apparatus for controlling a mobile terminal.

FIG. 26 is a schematic block diagram showing a configuration of an apparatus for controlling a mobile terminal. As shown in FIG. 26, the apparatus for controlling a mobile terminal includes a first camera 560 placed at a first position of the mobile terminal, a second camera 570 placed at a second position of the mobile terminal, a sensing unit 510 that detects the posture of the mobile terminal, a controller 520 that select the first camera 560 and/or the second camera 570 based on the posture of the mobile terminal in a camera mode, an image processing unit that processes an image captured by the first camera 560 or processes (i.e., encodes or decodes) an image captured by both the first camera 560 and the second camera 570 and a display unit 540 that displays the image which has been processed by the image processing unit 530. Here, the controller 520 may directly select the first camera 560 or the second camera 570 or may select the first camera 560 or the second camera 570 through a switching unit 580. The display may include a polarization filter (not shown) for providing a 3D stereoscopic image to the user.

The sensing unit 510 senses the posture of the mobile terminal by detecting a rotation direction angle of the mobile terminal. For example, the sensing unit 510 can sense the posture of the mobile terminal by detecting a rotation direction angle of the mobile terminal through a three-axis accelerometer that measures the three-axis acceleration of X, Y, and Z axes. The three-axis accelerometer is installed at the lower end of the right portion of the mobile terminal, and senses first to fourth directions of the mobile terminal based on the direction information of X, Y, and Z axes. The first direction may be 0 degrees, the second direction may be 90 degrees, the third direction may be 180 degrees, and the fourth direction may be 270 degrees.

When the mobile terminal is in a forward direction (namely, when the mobile terminal is not rotated so it is at 0 degree) based on the rotation direction angle of the mobile terminal, the controller 320 captures a 2D image through the first camera 560, and when the rotation direction angle of the mobile terminal is 90 degrees or 270 degrees, the controller 320 captures a 3D image through the first camera 560 and the second camera 570. Here, the storage unit 550 stores a look-up table for controlling the first camera 560 and the second camera 570 according to the rotation direction angle of the mobile terminal.

Figure 27:
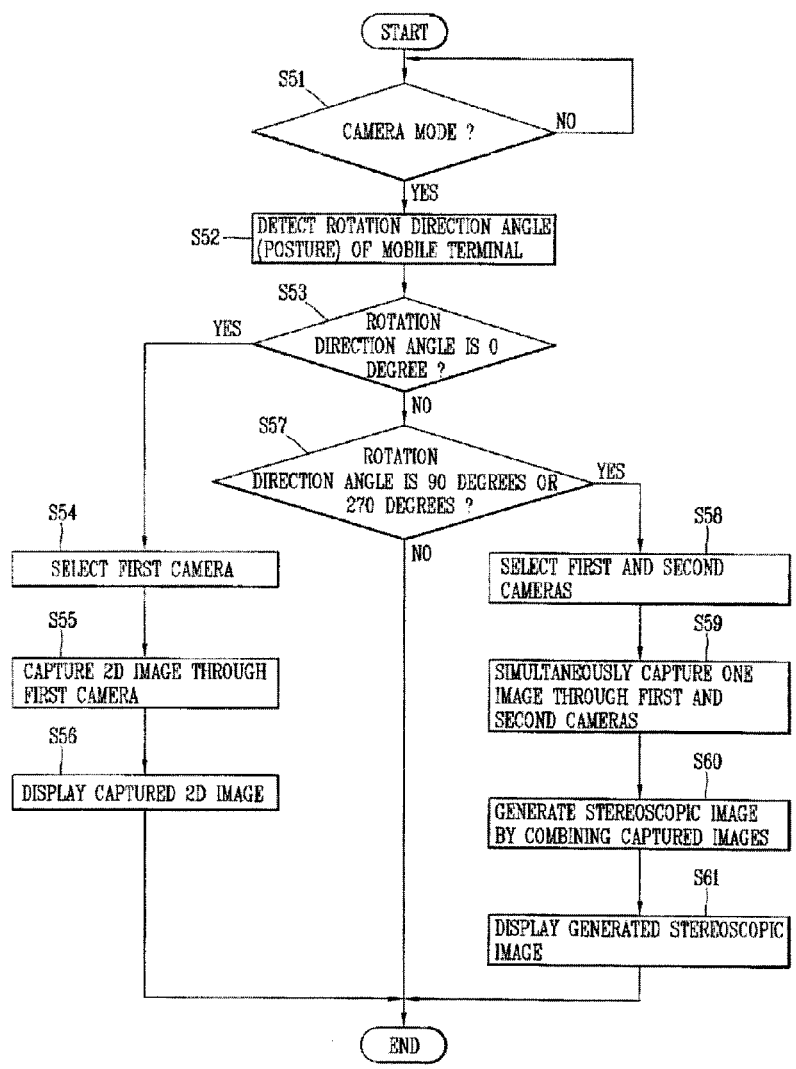
FIG. 27 is a flow chart of a fifth process for controlling a mobile terminal.

FIG. 27 is a flow chart of a fifth process for controlling a mobile terminal. First, whether a mode is in a camera mode is determined (S51). In particular, the controller 520 determines whether the mobile terminal is in a camera mode. For example, the controller 520 determines whether or not the camera mode has been selected by the user.

Next, a rotation direction angle of a mobile terminal is detected (S52). In particular, when the mobile terminal is in the camera mode, the sensing unit 510 can sense the posture of the mobile terminal by detecting a rotation direction angle of the mobile terminal under the control of the controller 520. For example, the sensing unit 510 can sense the posture of the mobile terminal by detecting a rotation direction angle of the mobile terminal through a three-axis accelerometer that measures the three-axis acceleration of X, Y, and Z axes.

Then, whether a rotation direction angle is 0 degrees is determined (S53). In particular, the controller 520 determines whether or not the rotation direction angle of the mobile terminal is 0 degrees based on the rotation direction angle of the mobile terminal detected by the sensing unit 510.

If the rotation direction angle is 0 degrees, a first camera is selected (S54). In particular when the rotation direction angle of the mobile terminal detected by the sensing unit 510 is 0 degrees, the controller 520 generates a control signal for selecting the first camera 560 and outputs the generated control signal to the switching unit 580. For example, when the rotation direction angle of the mobile terminal detected by the sensing unit 510 is 0 degrees, the controller 520 generates a control signal for selecting the first camera 560 based on the look-up table previously stored in the storage unit 550.

Figures 28, 29:
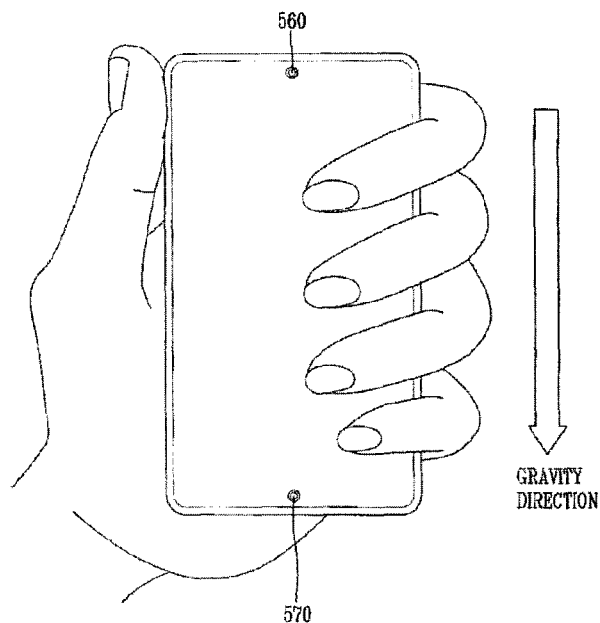
FIG. 28 illustrates a lookup table for controlling first and second cameras based on a rotation direction of a mobile terminal.
FIG. 29 illustrates first and second cameras installed at a mobile terminal.

FIG. 28 illustrates a lookup table for controlling first and second cameras based on a rotation direction angle of a mobile terminal. As shown in FIG. 28, when the rotation direction angle of the mobile terminal detected by the sensing unit 510 is 0 degrees, the controller 520 generates a control signal for turning on the first camera 560 based on the look-up table and outputs the generated signal to the switching unit 580. At this time, when the rotation direction angle of the mobile terminal detected by the sensing unit 510 is 0 degrees, the controller 520 generates a control signal for turning off the second camera 570 based on the look-up table and outputs the generated control signal to the switching unit 580. The switching unit 580 turns on the first camera 560 based on the control signal. At this time, when the rotation direction angle of the mobile terminal is 0 degrees, the controller 520 turns off the second camera 570 through the switching unit 580 based on the look-up table.

Next, a 2D image is captured through the first camera (S55). In particular, when the rotation direction angle of the mobile terminal is 0 degrees, the controller 520 captures a 2D image through the first camera 560 and outputs the captured image to the image processing unit 530. Thereafter, the captured 2D image is displayed (S56). In particular, the image processing unit 530 processes the 2D image which has been captured through the first camera 560 based on the control signal from the controller 520, and displays the processed 2D image on the display unit 540.

FIG. 29 illustrates first and second cameras installed at a mobile terminal. As shown in FIG. 29, when the rotation direction angle of the mobile terminal is 0 degrees, the controller 520 captures a 2D image through the first camera 560 installed at the upper end portion of the mobile terminal and displays the captured image on the display unit 540.

Meanwhile, whether a rotation direction angle is 90 or 270 degrees is determined (S57). In particular, when the rotation direction angle of the mobile terminal detected by the sensing unit 510 is not 0 degrees, the controller 520 determines whether rotation direction angle of the mobile terminal is 90 degrees or 270 degrees.

If the rotation direction angle is 90 or 270 degrees, a first camera and a second camera are selected (S58). In particular, when the rotation direction angle of the mobile terminal detected by the sensing unit 510 is 90 degrees or 270 degrees, the controller 520 generates a control signal for selecting the first camera 560 and the second camera 570 and outputs the control signal to the switching unit 580. For example, when the rotation direction angle of the mobile terminal detected by the sensing unit 510 is 90 degrees or 270 degrees, the controller 520 generates the control signal for selecting the first camera 560 and the second camera 570 based on the look-up table previously stored in the storage unit 550.

For example, when the rotation direction angle of the mobile terminal detected by the sensing unit 510 is 90 degrees or 270 degrees, the controller 520 generates the control signal for turning on the first camera 560 and the second camera 570 based on the look-up table, and outputs the generated control signal to the switching unit 580. The switching unit 580 turns on the first camera 560 and the second camera 570 based on the control signal.

Next, an image is simultaneously captured through the first and second cameras (S59). In particular, when the rotation direction angle of the mobile terminal is 90 degrees or 270 degrees, the controller 520 captures one image simultaneously through the first camera 560 and the second camera 570 and outputs the captured images to the image processing unit 530. In various implementations, the image can be captured through the first and second cameras either simultaneously or within a very short period of time, such that significant movement of objects in view of the cameras does not occur in the time between the capturing of the image by the cameras.

Then, a stereoscopic image is generated by combining the captured images (S61) and the generated stereoscopic image is displayed (S62). In particular, the image processing unit 530 combines the images which have been captured through the first camera 560 and the second camera 570 based on the control signal of the controller 520 to generate a 3D image and displays the generated 3D image on the display unit 540

Figure 30:
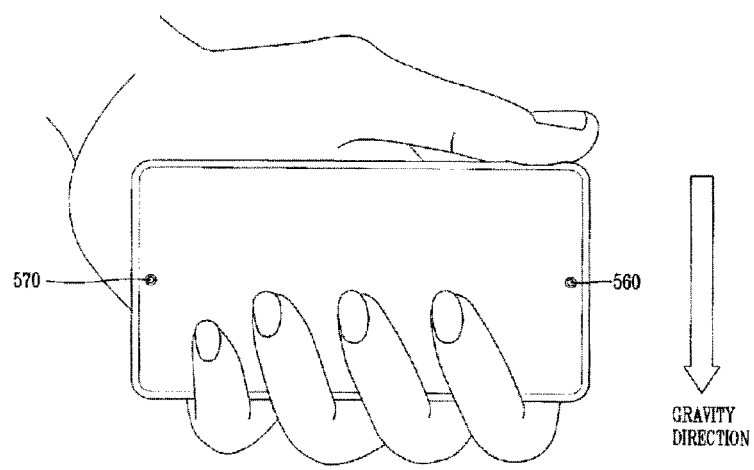
FIG. 30 illustrates operation of first and second cameras installed at a mobile terminal.

FIG. 30 illustrates operation of first and second cameras installed at a mobile terminal. As shown in FIG. 30, when the rotation direction angle of the mobile terminal is 90 degrees or 270 degrees, the controller 520 captures a 3D image through the first camera 560 installed at the upper end portion of the mobile terminal and through the second camera 570 installed at the lower end portion of the mobile terminal and displays the captured 3D image on the display unit 540 in real time. Here, the first camera 560 and the second camera 570 may be fixedly installed on the mobile terminal or may be installed to be rotatable to capture an image of a front side or a rear side of the mobile terminal.

Figure 31:
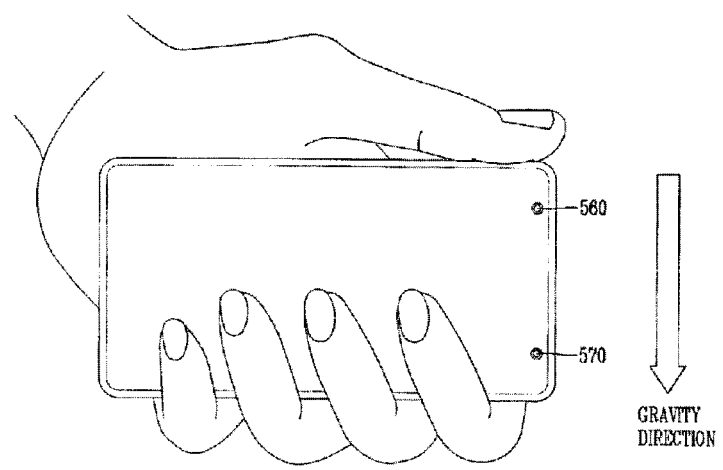
FIG. 31 illustrates cameras installed at a mobile terminal.

The first camera 560 and the second camera 570 may be installed at various positions of the mobile terminal. As described with respect to FIG. 31, the first and second cameras can be installed at various positions of a mobile terminal. FIG. 31 illustrates cameras installed at a mobile terminal. As shown in FIG. 31, the first camera 560 and the second camera 570 are installed at the upper end portion of the mobile terminal and spaced apart by a pre-set distance from each other. Here, the pre-set distance may refer to the distance between the first and second cameras required to capture a stereoscopic image. Thus, the mobile terminal can automatically capture a 2D image or a 3D stereoscopic image according to the posture of the mobile terminal, thus simplifying user capturing of a 2D or 3D image.

As described above, the first and second telephone transceivers can be installed on the mobile terminal and call communication can be performed through the first or second telephone transceiver based on the posture (e.g., a rotation direction angle) of a mobile terminal. Thus, call communication can be more freely performed regardless of the posture of the mobile terminal. Also, because the posture of the mobile terminal can be automatically recognized and UI data can be output in a forward direction according to the recognized posture of the mobile terminal, the user can more easily and conveniently view the corresponding UI data in a convenient perspective. In addition, because a 2D or 3D stereoscopic image can be automatically captured according to the posture of the mobile terminal, a user-desired image (2D image or 3D image) can be quickly captured.

As the description above may be embodied in various forms without departing from the characteristics thereof, it should also be understood that the above-described implementations are not limited by any of the details of the foregoing description, unless otherwise specified, but rather, should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A device comprising:
   a first camera positioned at a rear surface of the device;
   a second camera positioned at the rear surface of the device;
   a first microphone at a first position on the device;
   a second microphone at a second position on the device;
   a first speaker at a third position on the device;
   a second speaker at a fourth position on the device, wherein the first, second, third, and fourth positions of the device are different positions; and
   a controller configured to:
      determine whether a current mode of the device is a call mode,
      determine a posture of the device,
      select, based on the determined posture and determining that the current mode is the call mode, among the first microphone at the first position on the device and the second microphone at the second position on the device,
      select, based on the determined posture and determining that the current mode is the call mode, among the first speaker at the third position on the device and the second speaker at the fourth position on the device,
      capture a two-dimensional (2D) image through the first camera when the posture of the device is a pre-set first posture, and
      capture a three-dimensional (3D) image through the first and second cameras when the posture of the device is a pre-set second posture, wherein the pre-set first posture and the pre-set second posture are different each other.

2. The device of claim 1 wherein the controller is configured to:
   select, if the posture characteristic is a first posture and the determined current mode is the call mode, the first microphone at the first position on the device and the first speaker at the third position on the device;
   activate, based on the selected first microphone at the first position on the device and the first speaker at the third position on the device, the first microphone at the first position on the device and the first speaker at the third position on the device; and
   deactivate, based on the selected first microphone at the first position on the device and the first speaker at the third position on the device, the second microphone at the second position on the device and the second speaker at the fourth position on the device.

3. The device of claim 2 wherein the controller is configured to:
   select, if the determined posture is a second posture and the determined current mode is the call mode, the second microphone at the second position on the device and the second speaker at the fourth position on the device;
   activate, based on the selected second microphone at the second position on the device and the second speaker at the fourth position on the device, the second microphone at the second position on the device and the second speaker at the fourth position on the device; and
   deactivate, based on the selected second microphone at the second position on the device and the second speaker at the fourth position on the device, the first microphone at the first position on the device and the first speaker at the third position on the device.

4. The device of claim 3, wherein:
   wherein the controller is configured to determine the current mode of the device by determining whether the device is in the call mode, a video call mode, a multimedia reproduction mode, or a camera mode.

5. The device of claim 1 wherein:
activation of the first microphone at the first location of the device and the first speaker at the third location of the device and deactivation of the second microphone at the second location of the device and the second speaker at the fourth location of the device constitute a first operation state of the controller; and
activation of the second microphone at the second location of the device and the second speaker at the fourth location of the device and deactivation of the first microphone at the first location of the device and the first speaker at the third location of the device constitute a second operation state of the controller,
wherein the controller is configured to select, based on the determined posture, among the first and second operation states.

6. The device of claim 1 further comprising a sensing unit wherein:
to determine the posture of the device, the controller is configured to receive and process data from the sensing unit related to a sensed posture of the device; and
the controller is configured to select among the microphone and the speaker based on the processed data related to the sensed posture.

7. The device of claim 6 wherein:
the sensing unit includes one or more accelerometers;
to determine the posture of the device, the controller is configured to receive and process data from the one or more accelerometers related to a sensed posture of the device; and
the controller is configured to select among the microphone and the speaker based on the processed data related to the sensed posture.

8. The device of claim 7 wherein:
the one or more accelerometers are configured to sense one or more rotational direction angles of the device;
to determine the posture of the device, the controller is configured to receive and process data from the sensing unit related to the one or more rotational direction angles of the device; and
the controller is configured to select among the microphone and the speaker based on the processed data related to the one or more rotational direction angles of the device.

9. The device of claim 1 further comprising a display, wherein the controller is configured to select, based on the determined posture, among a first orientation of a graphical user interface to be rendered on the display and a second orientation of the graphical user interface to be rendered on the display.

10. The device of claim 1 wherein the controller includes one or more processors.

11. The device of claim 1 wherein the device is a mobile telephone.

12. The device of claim 1, wherein the controller is configured to determine the current mode of the device by determining whether the device is in the call mode, a video call mode, a multimedia reproduction mode, or a camera mode.

13. A method comprising:
determining a posture of a device, wherein the device includes:
a first microphone at a first position on the device,
a second microphone at a second position on the device,
a first speaker at a third position on the device,
a second speaker at a fourth position on the device, wherein the first, second, third, and fourth positions of the device are different positions;
a first camera positioned at a rear surface of the device; and
a second camera positioned at the rear surface of the device;
determining whether a current mode of the device is a call mode;
based on the determined posture and determining that the current mode is the call mode, selecting, by a controller of the device, among the first microphone at the first position on the device and the second microphone at a second position on the device;
based on the determined posture and determining that the current mode is the call mode, selecting, by the controller of the device, among the first speaker at the third position on the device and the second speaker at a fourth position on the device;
capturing a two-dimensional (2D) image through the first camera when the posture of the device is a pre-set first posture; and
capturing a three-dimensional (3D) image through the first and second cameras when the posture of the device is a pre-set second posture, and wherein the pre-set first posture and the pre-set second posture are different each other.

14. The method of claim 13 further comprising:
selecting, if the determined posture is a first posture and the determined current mode is the call mode, the first microphone at the first position on the device and the first speaker at the third position on the device;
activating, based on the selected first microphone at the first position on the device and the first speaker at the third position on the device, the first microphone at the first position on the device and the first speaker at the third position on the device; and
deactivating, based on the selected first microphone at the first position on the device and the first speaker at the third position on the device, the second microphone at the second position on the device and the second speaker at the fourth position on the device.

15. The method of claim 14 further comprising:
selecting, if the determined posture is a second posture and the determined current mode is the call mode, the second microphone at the second position on the device and the second speaker at the fourth position on the device;
activating, based on the selected second microphone at the second position on the device and the second speaker at the fourth position on the device, the second microphone at the second position on the device and the second speaker at the fourth position on the device; and
deactivating, based on the selected second microphone at the second position on the device and the second speaker at the fourth position on the device, the first microphone at the first position on the device and the first speaker at the third position on the device.

16. The method of claim 13 wherein:
activation of the first microphone at the first location of the device and the first speaker at the third location of the device and deactivation of the second microphone at the second location of the device and the second speaker at the fourth location of the device constitute a first operation state of the controller; and
activation of the second microphone at the second location of the device and the second speaker at the fourth location of the device and deactivation of the first microphone at the first location of the device and the first speaker at the third location of the device constitute a second operation state of the controller, the method further comprising selecting, based on the determined posture, among the first and second operation states.

17. The method of claim 16, further comprising sensing the characteristic of the device with a sensing unit, wherein:

determining the posture of the device includes receiving and processing data from the sensing unit related to a sensed posture of the device.

18. The method of claim 17 wherein:

the sensing unit includes one or more accelerometers; and determining the posture of the device includes receiving and processing data from the one or more accelerometers related to a sensed posture of the device.

19. The method of claim 18 wherein:

the one or more accelerometers are configured to sense one or more rotational direction angles of the device; and determining the posture of the device includes receiving and processing data from the one or more accelerometers related to the one or more rotational direction angles of the device.

20. The method of claim 13 further comprising selecting, based on the determined posture, among a first orientation of a graphical user interface to be rendered on a display and a second orientation of the graphical user interface to be rendered on the display.

21. The method of claim 13 wherein the device is a mobile telephone.

22. A device comprising:

a first camera positioned at a rear surface of the device;

a second camera positioned at the rear surface of the device;

a first microphone at a first position on the device;

a second microphone at a second position on the device;

a first speaker at a third position on the device;

a second speaker at a fourth position on the device, wherein the first, second, third, and fourth positions of the device are different positions; and a controller configured to:

determine whether a current mode of the device is a call mode, wherein each mode of the device is associated with one or more device states, determine a posture of the device, wherein each device state is associated with a posture of the device, select, based on the determined posture, a device state from among the one or more device states associated with determining that the current mode is the call mode, activate, based on the selected device state, one or more of the first microphone, the second microphone, the first speaker, and the second speaker, deactivate, based on the selected device state, one or more of the first microphone, the second microphone, the first speaker, and the second speaker, capture a two-dimensional (2D) image through the first camera when the posture of the device is a pre-set first posture, and capture a three-dimensional (3D) image through the first and second cameras when the posture of the device is a pre-set second posture, wherein the pre-set first posture and the pre-set second posture are different each other.

* * * * *